US010075810B2

(12) United States Patent
Patil et al.

(10) Patent No.: US 10,075,810 B2
(45) Date of Patent: Sep. 11, 2018

(54) TECHNIQUES FOR WIDE AREA NETWORK BASED VEHICLE-TO-VEHICLE SIGNALING

(71) Applicant: QUALCOMM Incorporated, San Diego, CA (US)

(72) Inventors: Shailesh Patil, Raritan, NJ (US); Georgios Tsirtsis, London (GB); Junyi Li, Chester, NJ (US); Hong Cheng, Basking Ridge, NJ (US); Sudhir Kumar Baghel, Bridgewater, NJ (US); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/273,452

(22) Filed: Sep. 22, 2016

(65) Prior Publication Data
US 2017/0127231 A1 May 4, 2017

Related U.S. Application Data

(60) Provisional application No. 62/249,177, filed on Oct. 30, 2015.

(51) Int. Cl.
*H04W 4/02* (2018.01)
*H04W 4/021* (2018.01)
(Continued)

(52) U.S. Cl.
CPC .......... *H04W 4/021* (2013.01); *H04W 4/027* (2013.01); *H04W 4/046* (2013.01);
(Continued)

(58) Field of Classification Search
CPC ....... H04W 4/02; H04W 4/021; H04W 60/00; H04W 16/18
(Continued)

(56) References Cited

U.S. PATENT DOCUMENTS 6,061,561 A * 5/2000 Alanara ................. G01S 19/17
455/456.1
6,198,927 B1 * 3/2001 Wright ................. H04W 60/00
455/435.1
(Continued)

FOREIGN PATENT DOCUMENTS

CN        104836673 A     8/2015

OTHER PUBLICATIONS

ISA/EP, International Search Report and Written Opinion of the International Searching Authority, Int'l Application No. PCT/US2016/053437, dated Dec. 2, 2016, European Patent Office, Rijswijk, NL. 13 pgs.

(Continued)

*Primary Examiner* — William D Cumming
(74) *Attorney, Agent, or Firm* — Holland & Hart LLP

(57) ABSTRACT

Techniques are described for wireless communication. A method for wireless communication at a first base station (e.g., corresponding to, associated with, or included in a first cell) includes receiving location information from a vehicle; identifying, based at least in part on the location information, a plurality of cells from which to broadcast a location message associated with the vehicle, where the plurality of cells include at least a cell of a second base station; and communicating with at least the second base station regarding a broadcast of the location message. A method for wireless communication at a vehicle include transmitting location information from the vehicle to a base station on an access stratum (AS) layer, and transmitting location message information to the base station. Numerous other aspects are provided.

28 Claims, 16 Drawing Sheets

(51) Int. Cl.
*H04W 60/00* (2009.01)
*H04W 16/18* (2009.01)
*H04W 4/04* (2009.01)
*H04W 76/04* (2009.01)
*H04W 72/04* (2009.01)
*H04W 76/27* (2018.01)
*H04W 84/12* (2009.01)

(52) U.S. Cl.
CPC ....... *H04W 72/042* (2013.01); *H04W 76/046* (2013.01); *H04W 76/27* (2018.02); *H04W 84/12* (2013.01)

(58) Field of Classification Search
USPC .................................. 455/411, 435.1, 456.1
See application file for complete search history.

(56) References Cited

U.S. PATENT DOCUMENTS

| | | | | |
|---|---|---|---|---|
| 6,603,966 | B1* | 8/2003 | Sheffield | H04W 16/18 370/241 |
| 7,305,244 | B2* | 12/2007 | Blomqvist | H04M 3/42348 342/357.43 |
| 7,957,753 | B2* | 6/2011 | Timiri | H04W 64/00 370/352 |
| 8,884,821 | B2* | 11/2014 | DeCabooter | B60R 25/1025 340/426.19 |
| 9,247,434 | B2* | 1/2016 | Tengler | H04L 63/126 |
| 9,878,619 | B2* | 1/2018 | Beattie, Jr. | B60K 35/00 |
| 9,888,372 | B2* | 2/2018 | Park | H04W 4/90 |
| 9,903,953 | B2* | 2/2018 | McClure | G01S 19/13 |
| 9,939,286 | B2* | 4/2018 | Raab | G01C 21/3682 |
| 2005/0147040 | A1* | 7/2005 | Vayanos | H03M 13/2707 370/235 |
| 2010/0112978 | A1 | 5/2010 | Cho et al. | |
| 2011/0149827 | A1 | 6/2011 | Na et al. | |
| 2012/0028607 | A1* | 2/2012 | Tengler | H04L 63/126 455/411 |
| 2017/0127231 | A1* | 5/2017 | Patil | H04W 4/021 |
| 2017/0374668 | A1* | 12/2017 | Tran | H04W 72/0486 |

OTHER PUBLICATIONS

QUALCOMM Incorporated, "Uu for V2V and V2P," 3GPP TSG-RAN WG1 Meeting #84, R1-160899, St. Julian's, Malta, Feb. 15-19, 2016, 7 pgs., XP051054223, 3rd Generation Partnership Project.

* cited by examiner

US 10,075,810 B2

TECHNIQUES FOR WIDE AREA NETWORK BASED VEHICLE-TO-VEHICLE SIGNALING

CROSS REFERENCES

The present Application for Patent claims priority to U.S. Provisional Patent Application No. 62/249,177 by PATIL, et al., titled "TECHNIQUES FOR WIDE AREA NETWORK BASED VEHICLE-TO-VEHICLE SIGNALING," filed Oct. 30, 2015, assigned to the assignee hereof which is hereby incorporated by reference in its entirety.

BACKGROUND

Field of the Disclosure

The present disclosure, for example, relates to wireless communication systems, and more particularly to techniques for wide area network (WAN) based vehicle-to-vehicle (V2V) signaling.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE). A base station may communicate with UEs on downlink channels (e.g., for transmissions from a base station to a UE) and uplink channels (e.g., for transmissions from a UE to a base station).

A UE may take the form of a vehicle equipped with a wireless communication device, such as a Long-Term Evolution (LTE) or LTE-Advanced (LTE-A) wireless communication device. Such a vehicle may communicate with base stations on downlink channels or uplink channels. In some examples, vehicles connected to a LTE/LTE-A network (or other network) may engage in WAN based V2V communication. For example, a vehicle may transmit location messages and other V2V information to one or more base stations on one or more uplink channels, and the base station(s) may broadcast the location messages to other vehicles on one or more downlink channels. Location messages may include, for example, vehicle locations, velocities, or directions, safety messages (e.g., vehicle malfunction warnings or crash warnings), etc. In some examples, location messages received by a vehicle may be used for vehicle navigation. In some examples, location messages received by a self-driving vehicle may be used by the self-driving vehicle for vehicle navigation.

SUMMARY

The present disclosure, for example, relates to techniques for WAN based V2V signaling. A challenge in the context of V2V signaling is the sometimes high density of vehicles within a geographic area. For example, during rush hour, a relatively small geographic area may contain hundreds or thousands of vehicles. When location messages received from each of the vehicles is blindly broadcast to all of the vehicles within the coverage area of a vehicle's serving base station, or to all of the vehicles within the coverage areas of the vehicle's serving base station and its neighboring base stations, the quantity of information broadcast can be very large, and a V2V wireless communication system including the base stations and the vehicles may operate inefficiently. If the base stations of the V2V wireless communication system also serve other UEs (e.g., mobile phones, smartphones, etc.), operation of the V2V wireless communication system can negatively impact the level of service provided the other UEs. Techniques described in the present disclosure enable base stations to broadcast location messages from a number of cells based on information such as: vehicle location information, one or more target broadcast ranges for location messages, and the locations and coverage areas of cells (or sectors) of one or more base stations.

In one example, a method for wireless communication at a first base station (e.g., corresponding to, associated with, or included in a first cell) is described. The method may include receiving location information from a vehicle; identifying, based at least in part on the location information, a plurality of cells from which to broadcast a location message associated with the vehicle, where the plurality of cells includes at least a first cell of the first base station and a second cell of a second base station, wherein the location message is based at least in part on the location information; and communicating with at least the second base station regarding a broadcast of the location message. In one example, identifying may include, identifying a plurality of cells from which to broadcast a location message associated with the vehicle, where the plurality of cells includes at least a cell of a second base station.

In some examples, the location information may be received from the vehicle on an access stratum (AS) layer. In some examples, the method may further include identifying a target broadcast range for the location message, and the plurality of cells may be further identified based at least in part on the target broadcast range. In some examples, the target broadcast range may be identified based at least in part on: a type of the location message, or a type of the vehicle, or receiving the target broadcast range from the vehicle, or a combination thereof. In some examples, the method may further include identifying a location and coverage area of one or more cells neighboring the first cell (e.g., of each cell of a number of neighboring cells), and the plurality of cells may be further identified based at least in part on the location and coverage area of at least one of the one or more cells neighboring the first cell. In some examples, the method may further include receiving, from the vehicle, location message information including at least one of: a content of the location message, or a type of the location message, or a combination thereof. In some examples, the method may further include refraining from broadcasting the location message for a predetermined number of time units after receiving the location message information from the vehicle. In some examples, communicating with at least the second base station may include transmitting to at least the second base station: a content of the location message, or a type of the location message, or the location information, or an indication of the plurality of cells, or a combination thereof.

In some examples, the method may further include identifying a set of at least one subframe in which to broadcast the location message over a single frequency network, at a same time the location message is broadcast from each cell of the plurality of cells. In some examples, identifying the set of at least one subframe may include identifying a geographic area associated with the location information, and indexing, using the geographic area, a mapping of geographic areas to sets of at least one subframe. In some examples, the method may further include broadcasting the mapping of geographic areas to sets of at least one subframe in at least one of: a system information block (SIB), or dedicated radio resource control (RRC) signaling, or a combination thereof. In some examples, the method may further include broadcasting, according to a message order known to each cell of the plurality of cells, a plurality of location messages pertaining to a plurality of vehicles located in the geographic area. In some examples, the message order may be based at least in part on: an ordering of vehicle locations within the geographic area, a time order in which location messages of the plurality of location messages are queued for transmission, a time order in which the location messages are received from the plurality of vehicles, or a combination thereof. In some examples, the method may further include transmitting scheduling information for the location message on a physical downlink control channel (PDCCH) of a subframe in the at least one subframe, the scheduling information associated with a cell radio network temporary identifier (C-RNTI) reserved for broadcasting location messages to vehicles. In some examples, the method may further include transmitting scheduling information for at least one non-vehicle data transmission on the PDCCH of the subframe.

In some examples, the method may further include identifying a geographic area associated with the location information; indexing, using the geographic area, a mapping of geographic areas to C-RNTIs, and transmitting scheduling information for the location message on a PDCCH of a subframe. The scheduling information may be associated with a C-RNTI mapped to the geographic area. In some examples, the method may further include broadcasting the mapping of geographic areas to C-RNTIs in at least one of: a SIB, or dedicated RRC signaling, or a combination thereof.

In one example, an apparatus for wireless communication at a first base station (e.g., corresponding to, associated with, or included in a first cell) is described. The apparatus may include means for receiving location information from a vehicle; means for identifying, based at least in part on the location information, a plurality of cells from which to broadcast a location message associated with the vehicle, where the plurality of cells includes at least a first cell of the first base station and a second cell of a second base station; and means for communicating with at least the second base station regarding the broadcast of the location message.

In some examples of the apparatus, the location information may be received from the vehicle on an AS layer. In some examples, the apparatus may further include means for identifying a target broadcast range for the location message, and the plurality of cells may be further identified based at least in part on the target broadcast range. In some examples, the target broadcast range may be identified based at least in part on: a type of the location message, or a type of the vehicle, or receiving the target broadcast range from the vehicle, or a combination thereof. In some examples, the apparatus may further include means for identifying a location and coverage area of one or more cells neighboring the first cell, and the plurality of cells may be further identified based at least in part on the location and coverage area of at least one of the number of neighboring cells. In some examples, the apparatus may further include means for receiving, from the vehicle, location message information including at least one of: a content of the location message, or a type of the location message, or a combination thereof.

In some examples, the apparatus may further include means for refraining from broadcasting the location message for a predetermined number of time units after receiving the location message information from the vehicle. In some examples, the means for communicating with at least the second base station may include means for transmitting to at least the second base station: a content of the location message, or a type of the location message, or the location information, or an indication of the plurality of cells, or a combination thereof.

In some examples, the apparatus may further include means for identifying a set of at least one subframe in which to broadcast the location message over a single frequency network, at a same time the location message is broadcast from each cell of the plurality of cells. In some examples, the means for identifying the set of at least one subframe may include means for identifying a geographic area associated with the location information, and means for indexing, using the geographic area, a mapping of geographic areas to sets of at least one subframe. In some examples, the apparatus may further include means for broadcasting the mapping of geographic areas to sets of at least one subframe in at least one of: a system information block (SIB), or dedicated RRC signaling, or a combination thereof. In some examples, the apparatus may further include means for broadcasting, according to a message order known to each cell of the plurality of cells, a plurality of location messages pertaining to a plurality of vehicles located in the geographic area. In some examples, the message order may be based at least in part on: an ordering of vehicle locations within the geographic area, a time order in which location messages of the plurality of location messages are queued for transmission, a time order in which the location messages are received from the plurality of vehicles, or a combination thereof. In some examples, the apparatus may further include means for transmitting scheduling information for the location message on a physical downlink control channel (PDCCH) of a subframe in the at least one subframe. The scheduling information may be associated with a C-RNTI reserved for broadcasting location messages to vehicles. In some examples, the apparatus may further include means for transmitting scheduling information for at least one non-vehicle data transmission on the PDCCH of the subframe.

In some examples, the apparatus may further include means for identifying a geographic area associated with the location information; means for indexing, using the geographic area, a mapping of geographic areas to C-RNTIs; and means for transmitting scheduling information for the location message on a PDCCH of a subframe. The scheduling information may be associated with a C-RNTI mapped to the geographic area. In some examples, the apparatus may further include means for broadcasting the mapping of geographic areas to C-RNTIs in at least one of: a SIB, or dedicated RRC signaling, or a combination thereof.

In one example, another apparatus for wireless communication at a first base station (e.g., corresponding to, associated with, or included in a first cell) is described. The apparatus may include a processor, and a memory in electronic communication with the processor. The processor and the memory may be configured to receive location information from a vehicle; to identify, based at least in part on the location information, a plurality of cells from which to broadcast a location message associated with the vehicle, the plurality of cells including at least a first cell of the first base station and a second cell of a second base station; and to communicate with at least the second base station regarding the broadcast of the location message.

In some examples of the apparatus, the location information may be received from the vehicle on an AS layer. In some examples, the processor and the memory may be further configured to identify a target broadcast range for the location message, and the plurality of cells may be further identified based at least in part on the target broadcast range. In some examples, the target broadcast range may be identified based at least in part on: a type of the location message, or a type of the vehicle, or receiving the target broadcast range from the vehicle, or a combination thereof. In some examples, the processor and the memory may be further configured to identify a location and coverage area of one or more cells neighboring the first cell (e.g., each cell of a number of neighboring cells), and the plurality of cells may be further identified based at least in part on the location and coverage area of at least one of the one or more cells neighboring the first cell. In some examples, the processor and the memory may be further configured to receive, from the vehicle, location message information including at least one of: a content of the location message, or a type of the location message, or a combination thereof. In some examples, the processor and the memory may be further configured to refrain from broadcasting the location message for a predetermined number of time units after receiving the location message information from the vehicle. In some examples, communicating with at least the second base station may include transmitting to at least the second base station: a content of the location message, or a type of the location message, or the location information, or an indication of the plurality of cells, or a combination thereof. In some examples, the processor and the memory may be further configured to identify a set of at least one subframe in which to broadcast the location message over a single frequency network, at a same time the location message is broadcast from each cell of the plurality of cells.

In one example, a non-transitory computer-readable medium storing computer-executable code for wireless communication at a first base station (e.g., corresponding to, associated with, or included in a first cell) is described. The code may be executable by a processor to receive location information from a vehicle; identify, based at least in part on the location information, a plurality of cells from which to broadcast a location message associated with the vehicle, the plurality of cells including at least a first cell of the first base station and a second cell of a second base station; and communicate with at least the second base station regarding the broadcast of the location message.

In some examples of the non-transitory computer-readable medium, the location information may be received from the vehicle on an AS layer. In some examples, the code executable by the processor to communicate with at least the second base station may include code executable by the processor to transmit to at least the second base station: a content of the location message, or a type of the location message, or the location information, or an indication of the plurality of cells, or a combination thereof. In some examples, the code may be further executable by the processor to identify a set of at least one subframe in which to broadcast the location message over a single frequency network, at a same time the location message is broadcast from each cell of the plurality of cells.

In one example, a method for wireless communication at a vehicle is described. The method may include transmitting location information from the vehicle to a base station on an AS layer, and transmitting location message information to the base station.

In some examples of the method, the location message information may include at least one of: a content of a location message, or a type of the location message, or a combination thereof. In some examples, the method may further include transmitting a target broadcast range for a location message to the base station. In some examples, the location information and the location message information may be transmitted in a same subframe. In some examples, the method may further include receiving a mapping of geographic areas to sets of at least one subframe in at least one of: a SIB, or dedicated RRC signaling, or a combination thereof; identifying a geographic area associated with a location of the vehicle; and monitoring for transmissions in a set of at least one subframe mapped to the geographic area. In some examples, the method may further include receiving a mapping of geographic areas to C-RNTIs in at least one of: a SIB, or dedicated RRC signaling, or a combination thereof identifying a geographic area associated with a location of the vehicle; and monitoring for transmissions associated with at least one C-RNTI mapped to the geographic area.

In one example, an apparatus for wireless communication at a vehicle is described. The apparatus may include means for transmitting location information from the vehicle to a base station on an AS layer, and means for transmitting location message information to the base station.

In some examples of the apparatus, the location message information may include at least one of: a content of a location message, or a type of the location message, or a combination thereof. In some examples, the apparatus may further include means for transmitting a target broadcast range for a location message to the base station. In some examples, the location information and the location message information may be transmitted in a same subframe. In some examples, the apparatus may further include means for receiving a mapping of geographic areas to sets of at least one subframe in at least one of: a SIB, or dedicated RRC signaling, or a combination thereof; means for identifying a geographic area associated with a location of the vehicle; and means for monitoring for transmissions in a set of at least one subframe mapped to the geographic area. In some examples, the apparatus may further include means for receiving a mapping of geographic areas to C-RNTIs in at least one of: a SIB, or dedicated RRC signaling, or a combination thereof; means for identifying a geographic area associated with a location of the vehicle; and means for monitoring for transmissions associated with at least one C-RNTI mapped to the geographic area.

In one example, another apparatus for wireless communication at a vehicle is described. The apparatus may include a processor, and a memory in electronic communication with the processor. The processor and the memory may be configured to transmit location information from the vehicle to a base station on an AS layer, and transmit location message information to the base station. In some examples, the location message information may include at least one of: a content of a location message, or a type of the location message, or a combination thereof. In some examples, the processor and the memory may be configured to transmit a target broadcast range for a location message to the base station.

In one example, a non-transitory computer-readable medium storing computer-executable code for wireless communication at a vehicle is described. The code may be executable by a processor to transmit location information from the vehicle to a base station on an AS layer, and to transmit location message information to the base station.

In some examples of the non-transitory computer-readable medium, the location message information may include at least one of: a content of a location message, or a type of the location message, or a combination thereof. In some examples, the code may be executable by the processor to transmit a target broadcast range for a location message to the base station.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which WAN based V2V signaling may be improved. The techniques may improve the efficiency of a wireless communication system in which the WAN based V2V signaling is performed. In some examples, the wireless communication system may be or include a LTE/LTE-A network.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
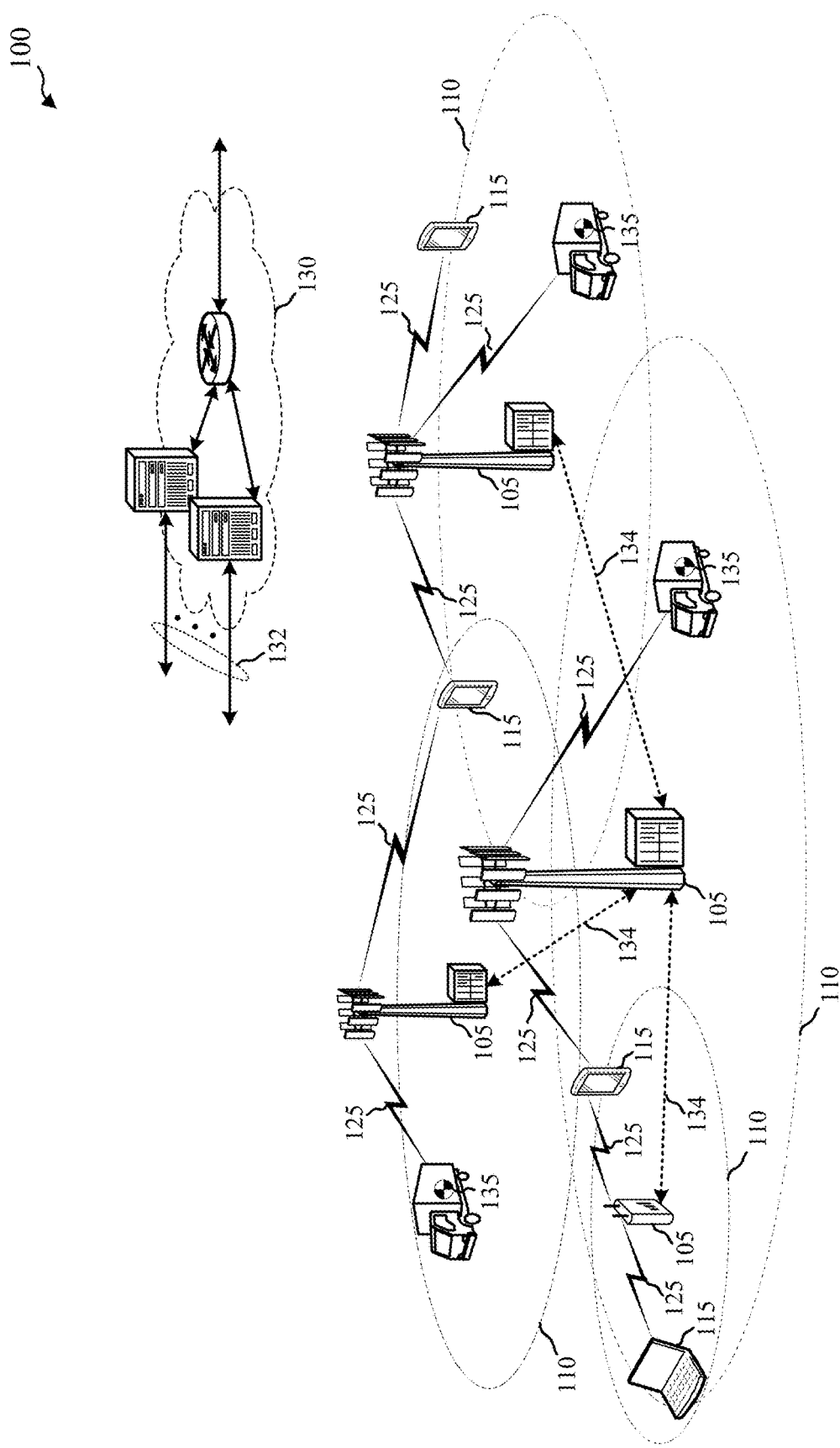
FIG. 1 illustrates an example of a wireless communication system, in accordance with various aspects of the disclosure.

FIG. 1 illustrates an example of a wireless communication system 100, in accordance with various aspects of the disclosure. The wireless communication system 100 may include base stations 105, UEs 115, and a core network 130. Some of the UEs may take the form of vehicles 135 equipped with wireless communication devices. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115 and the vehicles 135, or may operate under the control of a base station controller (not shown). In various examples, the base stations 105 may communicate with each other, either directly or indirectly (e.g., through core network 130), over backhaul links 134 (e.g., X1, X2, etc.), which may be wired or wireless communication links.

The base stations 105 may wirelessly communicate with the UEs 115 and the vehicles 135 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into a plurality of cells or sectors (not shown). The wireless communication system 100 may include base stations 105 of different types (e.g., macro or small cell base stations). There may be overlapping geographic coverage areas 110 for different technologies.

In some examples, the wireless communication system 100 may include a LTE/LTE-A network. In LTE/LTE-A networks, the term evolved Node B (eNB) may be used to describe sets of one or more of the base stations 105. The wireless communication system 100 may be a Heterogeneous LTE/LTE-A network, in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 or a vehicle 135 and the base stations 105 or core network 130 supporting radio bearers for the user plane data. At the Physical (PHY) layer, the transport channels may be mapped to Physical channels.

The UEs 115 and the vehicles 135 may be dispersed throughout the wireless communication system 100, and each UE 115 or vehicle 135 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 or a vehicle 135 may be able to communicate with various types of base stations and network equipment, including macro eNBs, small cell eNBs, relay base stations, and the like.

The communication links 125 shown in wireless communication system 100 may include downlink (DL) channels, from a base station 105 to a UE 115 or vehicle 135, or uplink (UL) channels, from a UE 115 or vehicle 135 to a base station 105. The downlink channels may also be called forward link channels, while the uplink channels may also be called reverse link channels.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, UEs 115, or vehicles 135 may include multiple antennas for employing antenna diversity schemes to improve communication quality and reliability between the base stations 105 and UEs 115 or vehicles 135. Additionally or alternatively, base stations 105, UEs 115, or vehicles 135 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

Figure 2:
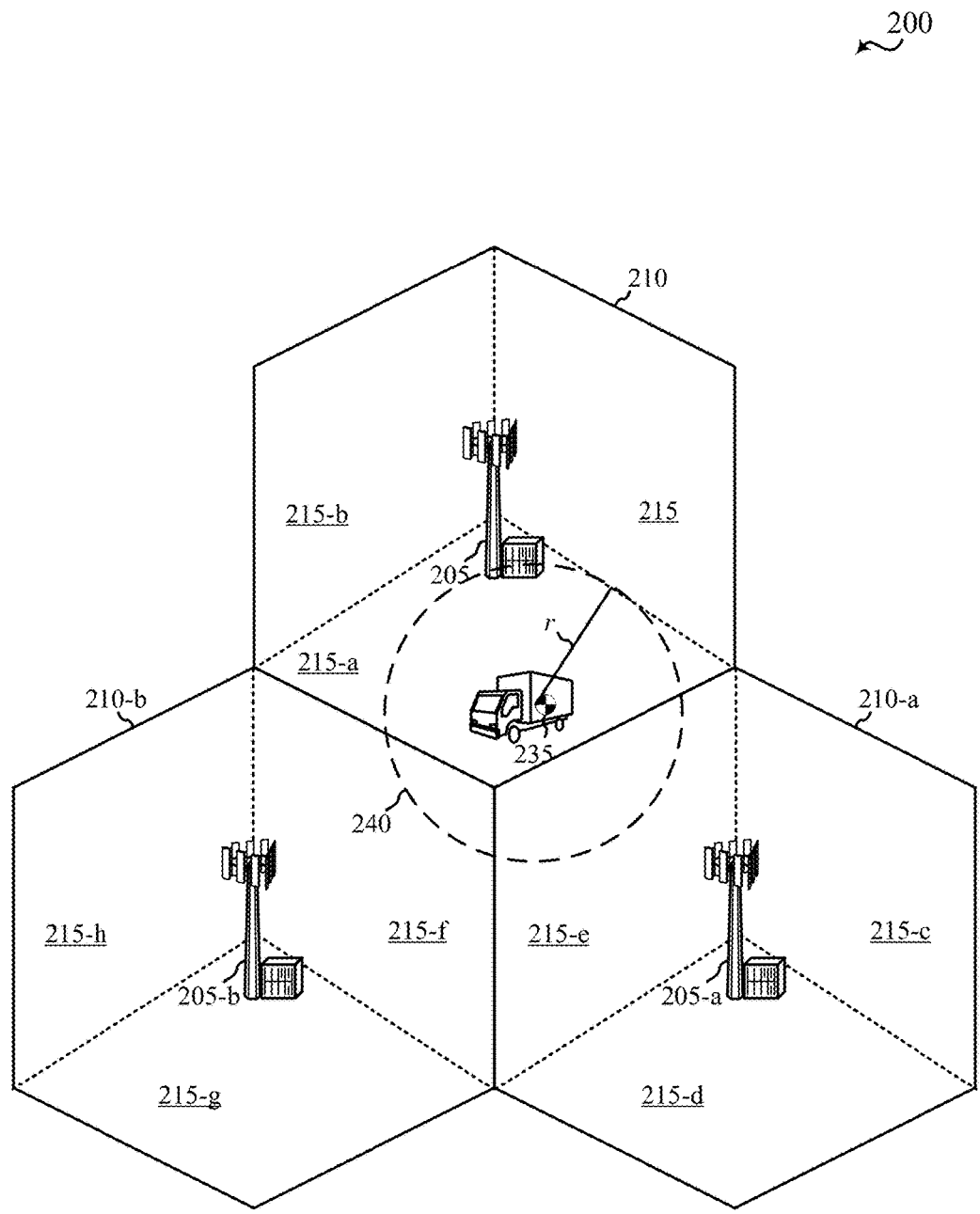
FIG. 2 shows a wireless communication system, in accordance with various aspects of the present disclosure.

FIG. 2 shows a wireless communication system 200, in accordance with various aspects of the present disclosure. The wireless communication system 200 may include a number of base stations (including, e.g., a first base station 205, a second base station 205-a, and a third base station 205-b) and a number of UEs or vehicles (e.g., a vehicle 235). The first base station 205, the second base station 205-a, and the third base station 205-b may be examples of aspects of the base stations 105 described with reference to FIG. 1, and the vehicle 235 may be an example of aspects of the vehicles 135 described with reference to FIG. 1. In some examples, the first base station 205, the second base station 205-a, the third base station 205-b, and the vehicle 235 may operate as part of a LTE/LTE-A network.

Each of the base stations may be associated with a respective coverage area. For example, the first base station 205 may be associated with a first coverage area 210, the second base station 205-a may be associated with a second coverage area 210-a, and the third base station 205-b may be associated with a third coverage area 210-b. Each of the coverage areas may include a plurality of cells (sectors). For example, the first coverage area 210 may include a first cell 215, a second cell 215-a, and a third cell 215-b, the second coverage area 210-a may include a fourth cell 215-c, a fifth cell 215-d, and a sixth cell 215-e, and the third coverage area 210-b may include a seventh cell 215-f, an eighth cell 215-g, and a ninth cell 215-h.

By way of example, the first base station 205 may operate as a serving base station for the vehicle 235. The vehicle 235 may transmit location information (e.g., a location of the vehicle 235 or geographic area in which the vehicle 235 is located) to the first base station 205, and in some examples, may transmit location message information (e.g., a content of a location message, or a type of the location message, or a combination thereof) and/or a target broadcast range 240 (a range of radius r about the vehicle's location) for the location message to the first base station 205. At least the location information may be transmitted from the vehicle 235 to the first base station on an AS layer (e.g., on a MAC layer (e.g., using a MAC layer control element), or on a PDCP layer, or on a combination thereof). In another embodiment, the location information may be transmitted from the vehicle 235 to the first base station on an upper layer. In aspects, location messages may include, for example, vehicle locations, velocities, or directions, safety messages (e.g., vehicle malfunction warnings or crash warnings), etc. In some examples, location messages received by a vehicle may be used for vehicle navigation. In some examples, location messages received by a self-driving vehicle may be used by the self-driving vehicle for vehicle navigation.

Based at least in part on the location information, the first base station 205 (e.g., corresponding to, associated with, or included in a first cell) may identify a plurality of cells from which to broadcast the location message. In some examples, the plurality of cells may also be identified based at least in part on an identified target broadcast range for the location message (which may be received from the vehicle 235 or identified, for example, based on the type of the location message or a type of the vehicle 235). In some examples, the plurality of cells may also be identified based at least in part on the locations and coverage areas of the cells of the first base station 205, the second base station 205-a, and the third base station 205-b. For example, the first base station 205 may identify the plurality of cells from which to broadcast the location message as the second cell 215-a, the sixth cell 215-e, and the seventh cell 215-f. This identification may be based at least in part on a determination that the target broadcast range for the location message overlaps the coverage areas of the second cell 215-a, the sixth cell 215-e, and the seventh cell 215-f. In some examples, the locations and coverage areas of neighboring cells may be signaled using X2 or S1 signaling, or using an operation, administration, and maintenance (OAM) interface. In aspects of the above-described example, neighboring cell may include one or more cells neighboring the first cell.

Upon identifying the plurality of cells, the first base station 205 may communicate with the base stations associated with the identified cells regarding a broadcast of the location message. In some examples, communicating with the identified base stations may include transmitting, to the base stations, a content of the location message, or a type of the location message, or the location information, or an indication of the plurality of cells, or a combination thereof.

In some examples, the first base station 205, the second base station 205-a, and the third base station 205-b may refrain from broadcasting the location message associated with the vehicle 235 for a predetermined number of time units after receiving the location message information from the vehicle 235. Thus, the location message information may be time-stamped, and may be transmitted to the second base station 205-a and the third base station 205-b with a time-stamp. Refraining from broadcasting a location message for a period of time can give base stations time to communicate regarding the broadcast of location messages, and provide time to update (e.g., harmonize) lists of vehicles for which cells of the base stations will broadcast location messages (e.g., so that the cells broadcast to the same list of vehicles and can broadcast location messages in a SFN manner).

In some examples, the broadcasts of the location message associated with the vehicle 235 may be made over a SFN (e.g., in multicast-broadcast single-frequency network (MB-SFN) subframes of a LTE/LTE-A network).

Broadcast of the location message associated with the vehicle 235, as described with reference to FIG. 2, can reduce the number of cells from which the location message is broadcast (e.g., from a set of nine cells to a set of three cells), and can reduce the number of resources and amount of power used to broadcast the location message.

Figure 3:
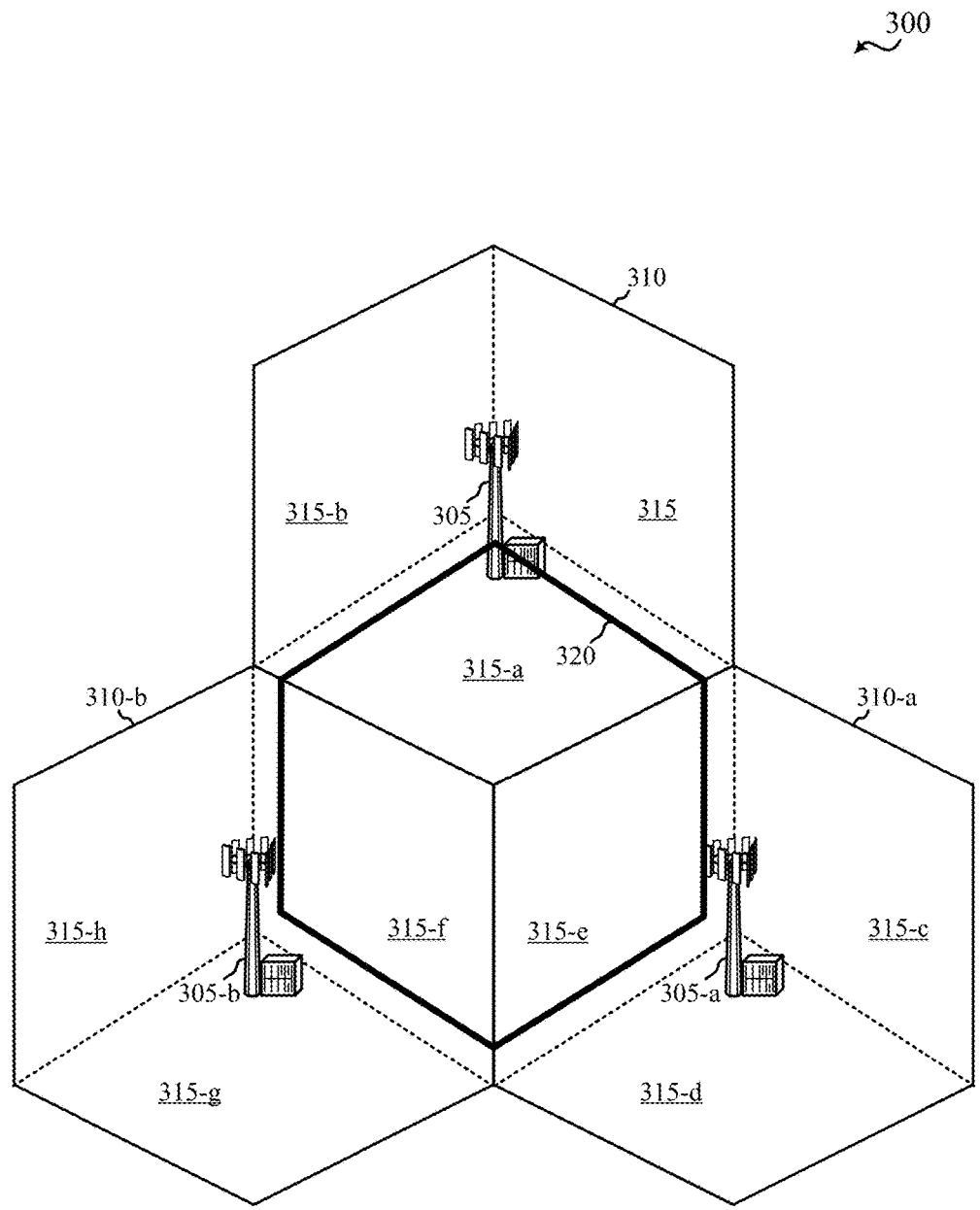
FIG. 3 shows a wireless communication system, in accordance with various aspects of the present disclosure.

FIG. 3 shows a wireless communication system 300, in accordance with various aspects of the present disclosure. The wireless communication system 300 may include a number of base stations (including, e.g., a first base station 305, a second base station 305-a, and a third base station 305-b). The first base station 305, the second base station 305-a, and the third base station 305-b may be examples of aspects of the base stations 105 described with reference to FIG. 1. In some examples, the first base station 305, the second base station 305-a, and the third base station 305-b may operate as part of a LTE/LTE-A network.

Each of the base stations may be associated with a respective coverage area. For example, the first base station 305 may be associated with a first coverage area 310, the second base station 305-a may be associated with a second coverage area 310-a, and the third base station 305-b may be associated with a third coverage area 310-b. Each of the coverage areas may include a plurality of cells (sectors). For example, the first coverage area 310 may include a first cell 315, a second cell 315-a, and a third cell 315-b, the second coverage area 310-a may include a fourth cell 315-c, a fifth cell 315-d, and a sixth cell 315-e, and the third coverage area 310-b may include a seventh cell 315-f, an eighth cell 315-g, and a ninth cell 315-h.

As vehicles move within the wireless communication system 300, the plurality of cells from which location messages associated with the vehicles are broadcast can change. To reduce the quantity of coordination information exchanged between base stations for broadcasting location messages associated with vehicles and/or to reduce the latencies associated with V2V communication, a semi-static mapping of geographic areas to resources (e.g., subframes) may be shared/used by the base stations of the wireless communication system 300. An example of one geographic area 320 is shown in FIG. 3. As demonstrated by the geographic area 320, geographic areas may include cells of more than one base station. A geographic area may alternatively include cells of just one base station. Resources that may be mapped to the geographic area 320 are shown in FIG. 4.

Figure 4:
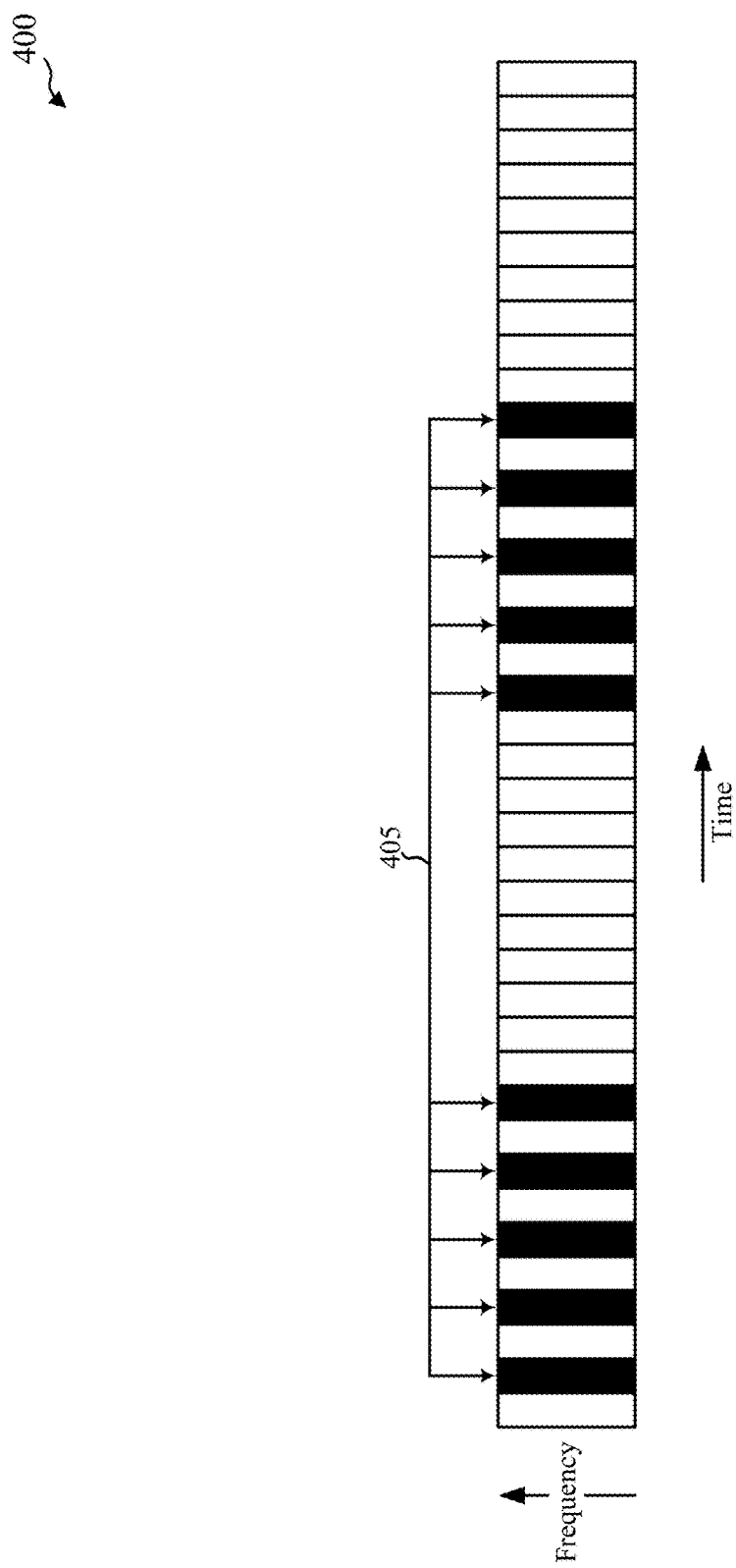
FIG. 4 shows a sequence of subframes in which transmissions may be made by base stations, UEs, or vehicles, in accordance with various aspects of the present disclosure.

FIG. 4 shows a sequence of subframes 400 in which transmissions may be made by base stations, UEs, or vehicles, in accordance with various aspects of the present disclosure. The base stations, UEs, or vehicles that may transmit in the subframes of the sequence of subframes 400 may include, for example, aspects of the base stations 105, 205, 205-a, 205-b, 305, 305, 305-a, or 305-b, or UEs 115, or vehicles 135 or 235 described with reference to FIG. 1, 2, or 3.

In some examples, the set of subframes 405 may be mapped to the geographic area 320 described with reference to FIG. 3, and when a location message associated with a vehicle located within the geographic area 320 is to be broadcast, each of the first base station 305, the second base station 305-a, and the third base station 305-b described with reference to FIG. 3 may broadcast the location message in each subframe of the set of subframes 405. Other sets of subframes may be mapped to other geographic areas.

In some examples, the subframes of the set of subframes 405 may be LTE/LTE-A MBSFN subframes. To facility the broadcast of location messages over a single frequency network, location messages pertaining to a plurality of vehicles located in a geographic area (e.g., the geographic area 320 of FIG. 3) may be broadcast according to a message order known to each base station or cell broadcasting the location messages. In some examples, the message order may be based at least in part on: an ordering of vehicle locations within the geographic area (e.g., based on latitude and longitude location information associated with the vehicles), a time order in which the location messages of the plurality of location messages are queued for transmission, a time order in which the location messages are received from the plurality of vehicles, or a combination thereof.

Figure 5:
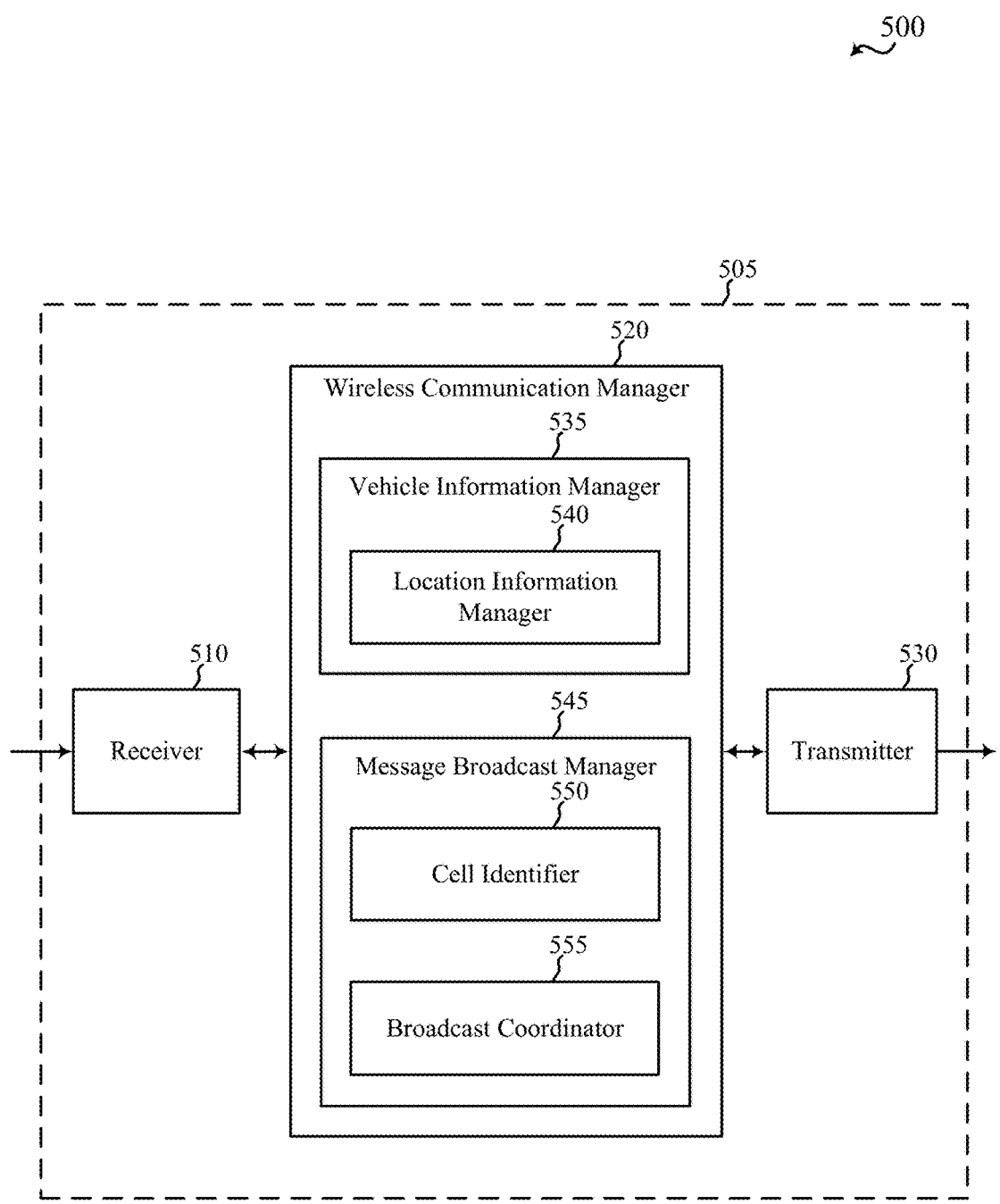
FIG. 5 shows a block diagram of an apparatus for use in wireless communication, in accordance with various aspects of the present disclosure.

FIG. 5 shows a block diagram 500 of an apparatus 505 for use in wireless communication, in accordance with various aspects of the present disclosure. The apparatus 505 may be an example of aspects of one or more of the base stations 105, 205, 205-a, 205-b, 305, 305-a, or 305-b described with reference to FIG. 1, 2, or 3. The apparatus 505 may also be or include a processor. The apparatus 505 may include a receiver 510, a wireless communication manager 520, or a transmitter 530. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as at least one RF receiver operable to receive transmissions over a number of radio frequency spectrum bands. In some examples, one or more of the radio frequency spectrum bands may be used for LTE/LTE-A communications, as described, for example, with reference to FIG. 1, 2, 3, or 4. The receiver 510 may be used to receive various types of data or control signals (i.e., transmissions) over one or more communication links of a wireless communication system, such as one or more communication links of the wireless communication system 100, 200, or 300 described with reference to FIG. 1, 2, or 3.

In some examples, the transmitter 530 may include at least one RF transmitter, such as at least one RF transmitter operable to transmit over the number of radio frequency spectrum bands. The transmitter 530 may be used to transmit various types of data or control signals (i.e., transmissions) over one or more communication links of a wireless communication system, such as one or more communication links of the wireless communication system 100, 200, or 300 described with reference to FIG. 1, 2, or 3.

In some examples, the wireless communication manager 520 may be used to manage one or more aspects of wireless communication for the apparatus 505. In some examples, part of the wireless communication manager 520 may be incorporated into or shared with the receiver 510 or the transmitter 530. In some examples, the wireless communication manager 520 may include a vehicle information manager 535 or a message broadcast manager 545.

The vehicle information manager 535 may include a location information manager 540. The location information manager 540 may be used to receive location information from a vehicle. In some examples, the location information may be received from the vehicle on an AS layer (e.g., on a MAC layer (e.g., using a MAC layer control element), or on a PDCP layer, or on a combination thereof).

The message broadcast manager 545 may include a cell identifier 550 or a broadcast coordinator 555. The cell identifier 550 may be used to identify, based at least in part on the location information, a plurality of cells from which to broadcast a location message associated with the vehicle. The plurality of cells may include at least a first cell of a first base station (e.g., a base station including the apparatus 505) and a second cell of a second base station. The broadcast coordinator 555 may be used to communicate with at least the second base station regarding a broadcast of the location message.

Figure 6:
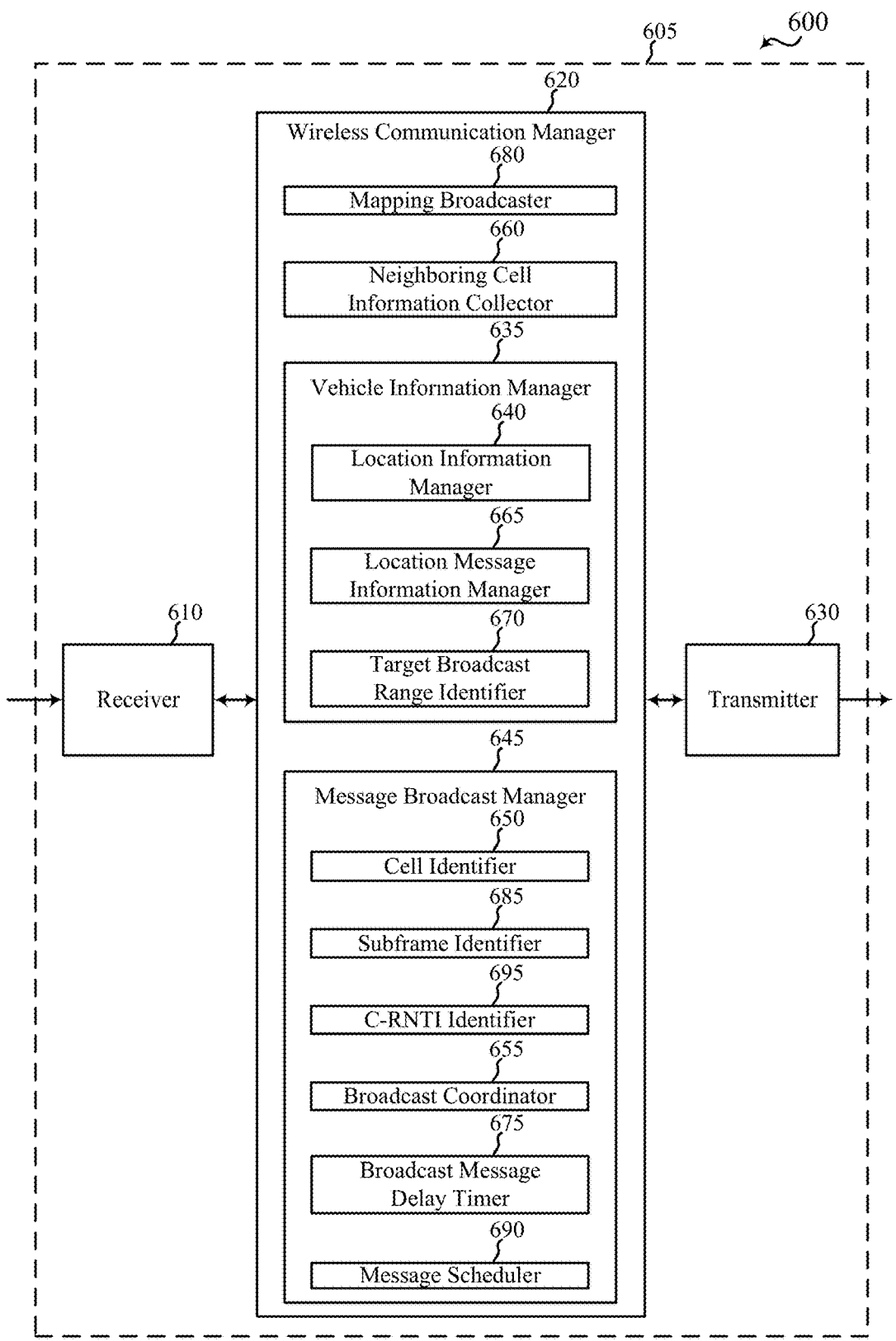
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations 105, 205, 205-a, 205-b, 305, 305-a, or 305-b described with reference to FIG. 1, 2, or 3, or aspects of the apparatus 505 described with reference to FIG. 5. The apparatus 605 may also be or include a processor. The apparatus 605 may include a receiver 610, a wireless communication manager 620, or a transmitter 630. Each of these components may be in communication with each other.

The components of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one RF receiver, such as at least one RF receiver operable to receive transmissions over a number of radio frequency spectrum bands. In some examples, one or more of the radio frequency spectrum bands may be used for LTE/LTE-A communications, as described, for example, with reference to FIG. 1, 2, 3, or 4. The receiver 610 may be used to receive various types of data or control signals (i.e., transmissions) over one or more communication links of a wireless communication system, such as one or more communication links of the wireless communication system 100, 200, or 300 described with reference to FIG. 1, 2, or 3.

In some examples, the transmitter 630 may include at least one RF transmitter, such as at least one RF transmitter operable to transmit over the number of radio frequency spectrum bands. The transmitter 630 may be used to transmit various types of data or control signals (i.e., transmissions) over one or more communication links of a wireless communication system, such as one or more communication links of the wireless communication system 100, 200, or 300 described with reference to FIG. 1, 2, or 3.

In some examples, the wireless communication manager 620 may be used to manage one or more aspects of wireless communication for the apparatus 605. In some examples, part of the wireless communication manager 620 may be incorporated into or shared with the receiver 610 or the transmitter 630. In some examples, the wireless communication manager 620 may include a mapping broadcaster 680, a neighboring cell information collector 660, a vehicle information manager 635, or a message broadcast manager 645.

The mapping broadcaster 680 may be used to broadcast (e.g., to vehicles) a mapping of geographic areas to sets of at least one subframe, or a mapping of geographic areas to C-RNTIs. In some examples, the mapping(s) may be broadcast in at least one of: a SIB, dedicated RRC signaling, or a combination thereof.

The neighboring cell information collector 660 may be used to identify a location and coverage area of each cell of a number of neighboring cells (which neighboring cell(s) may include one or more cells of a first base station (e.g., a base station including the apparatus 605) and/or one or more cells of neighboring base stations).

The vehicle information manager 635 may include a location information manager 640, a location message information manager 665, or a target broadcast range identifier 670. The location information manager 640 may be used to receive location information from a vehicle. In some examples, the location information may be received from the vehicle on an AS layer (e.g., on a MAC layer (e.g., using a MAC layer control element), or on a PDCP layer, or on a combination thereof). The location message information manager 665 may be used to receive, from the vehicle, location message information. The location message information may include at least one of: a content of a location message associated with the vehicle, or a type of the location message, or a combination thereof. In some examples, the type of the location message may be inferred from an indication to broadcast a location message, which indication may be received from the vehicle. In some examples, the indication may include a single bit. In some examples, the indication may be a transmission of the location information received by the location information manager 640. The target broadcast range identifier 670 may be used to identify a target broadcast range for the location message. In some examples, the target broadcast range may be identified based at least in part on: a type of the location message, or a type of the vehicle, or receiving the target broadcast range from the vehicle, or a combination thereof.

The message broadcast manager 645 may be used to broadcast the location message. In some examples, the message broadcast manager 645 may broadcast, according to a message order known to each cell of the plurality of cells, a plurality of location messages pertaining to a plurality of vehicles located in a geographic area. In some examples, the message order may be based at least in part on: an ordering of vehicle locations within the geographic area, a time order in which the location messages of the plurality of location messages are queued for transmission, a time order in which the location messages are received from the plurality of vehicles, or a combination thereof.

In some examples, the message broadcast manager 645 may include a cell identifier 650, a subframe identifier 685, a C-RNTI identifier 695, a broadcast coordinator 655, a broadcast message delay timer 675, a message scheduler 690. The cell identifier 650 may be used to identify, based at least in part on the location information, the target broadcast range, and/or the location and coverage area of at least one of the number of neighboring cells, a plurality of cells from which to broadcast the location message. The plurality of cells may include at least a first cell of the first base station and a second cell of a second base station. The subframe identifier 685 may be used to identify a set of at least one subframe in which to broadcast the location message over a single frequency network, at a same time the location message is broadcast from each cell of the plurality of cells. In some examples, the set of at least one subframe may include a set of at least one LTE/LTE-A MBSFN subframe. In some examples, identifying the set of at least one subframe may include identifying a geographic area associated with the location information, and indexing, using the geographic area, the mapping of geographic areas to sets of at least one subframe. The C-RNTI identifier 695 may be used, in some examples, to identify a geographic area associated with the location information, and to index, using the geographic area, the mapping of geographic areas to C-RNTIs. The broadcast coordinator 655 may be used to communicate with at least the second base station regarding a broadcast of the location message. In some examples, the communicating may include transmitting to at least the second base station: a content of the location message, or a type of the location message, or the location information, or an indication of the plurality of cells, or a combination thereof. The broadcast message delay timer 675 may be used to refrain from broadcasting the location message for a predetermined number of time units after receiving the location message information from the vehicle. The message scheduler 690 may be used to transmit scheduling information for the location message on a PDCCH of a subframe in the at least one subframe. The scheduling information may be associated with a C-RNTI reserved for broadcasting location messages to vehicles, or with a C-RNTI mapped to the geographic area. In some examples, the message scheduler 690 may also be used to transmit scheduling information for at least one non-vehicle data transmission on the PDCCH of the subframe. The scheduling information for the at least one non-vehicle data transmission may not be associated with the C-RNTI reserved for broadcasting location messages to vehicles (but may be associated with one or more other C-RNTIs).

Figure 7:
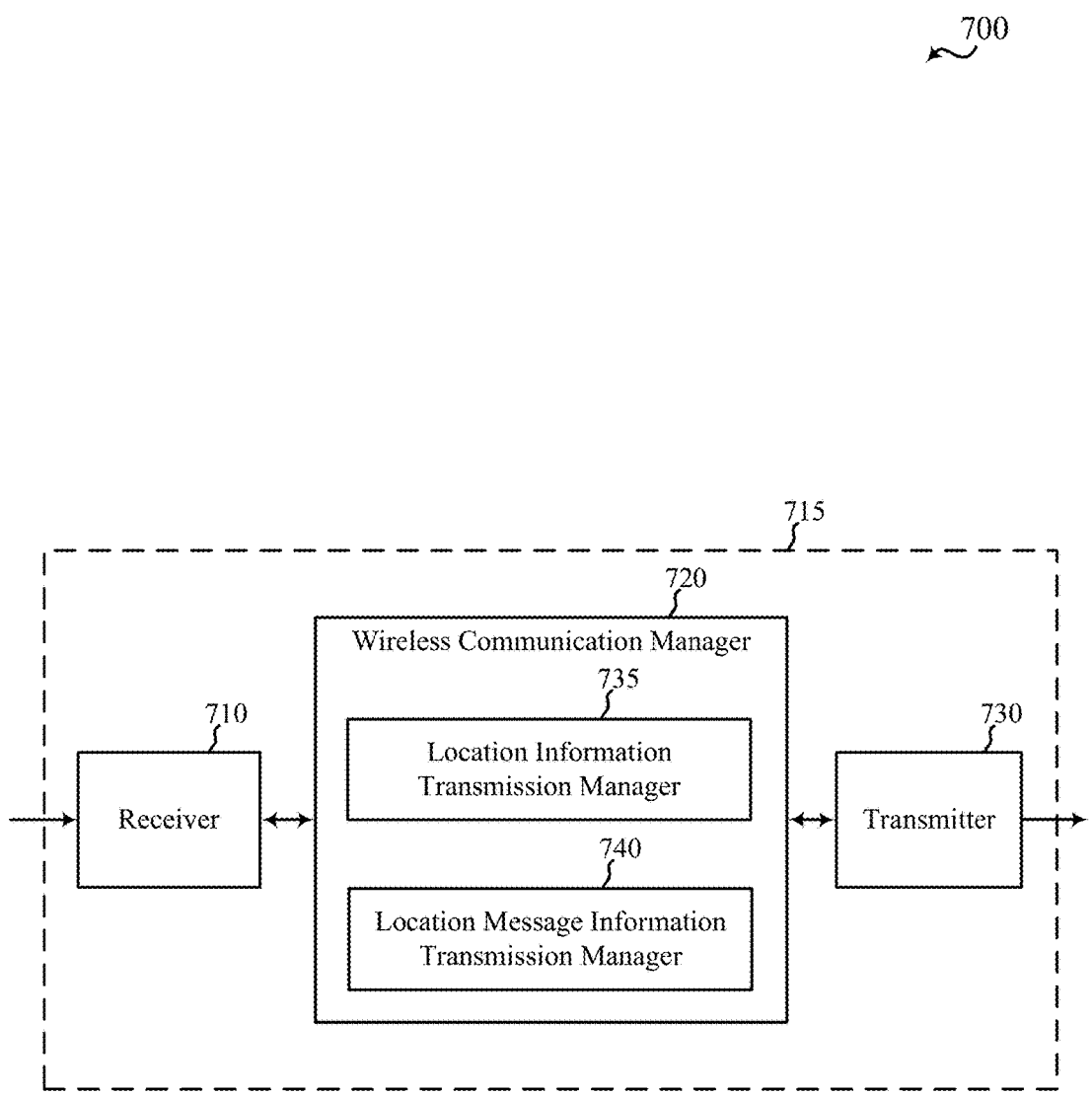
FIG. 7 shows a block diagram of an apparatus for use in wireless communication, in accordance with various aspects of the present disclosure.

FIG. 7 shows a block diagram 700 of an apparatus 715 for use in wireless communication, in accordance with various aspects of the present disclosure. The apparatus 715 may be an example of aspects of one or more of the vehicles 135 or 235 described with reference to FIG. 1 or 2. The apparatus 715 may also be or include a processor. The apparatus 715 may include a receiver 710, a wireless communication manager 720, or a transmitter 730. Each of these components may be in communication with each other.

The components of the apparatus 715 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over a number of radio frequency spectrum bands. In some examples, one or more of the radio frequency spectrum bands may be used for LTE/LTE-A communications, as described, for example, with reference to FIG. 1, 2, 3, or 4. The receiver 710 may be used to receive various types of data or control signals (i.e., transmissions) over one or more communication links of a wireless communication system, such as one or more communication links of the wireless communication system 100, 200, or 300 described with reference to FIG. 1, 2, or 3.

In some examples, the transmitter 730 may include at least one RF transmitter, such as at least one RF transmitter operable to transmit over the number of radio frequency spectrum bands. The transmitter 730 may be used to transmit various types of data or control signals (i.e., transmissions) over one or more communication links of a wireless communication system, such as one or more communication links of the wireless communication system 100, 200, or 300 described with reference to FIG. 1, 2, or 3.

In some examples, the wireless communication manager 720 may be used to manage one or more aspects of wireless communication for the apparatus 715. In some examples, part of the wireless communication manager 720 may be incorporated into or shared with the receiver 710 or the transmitter 730. In some examples, the wireless communication manager 720 may include a location information transmission manager 735 or a location message information transmission manager 740.

The location information transmission manager 735 may be used to transmit location information from the apparatus 715 to a base station on an AS layer (e.g., on a MAC layer (e.g., using a MAC layer control element), or on a PDCP layer, or on a combination thereof). The location message information transmission manager 740 may be used to transmit location message information from the apparatus 715 to the base station. The location message information may include at least one of: a content of a location message associated with the vehicle, or a type of the location message, or a combination thereof.

Figure 8:
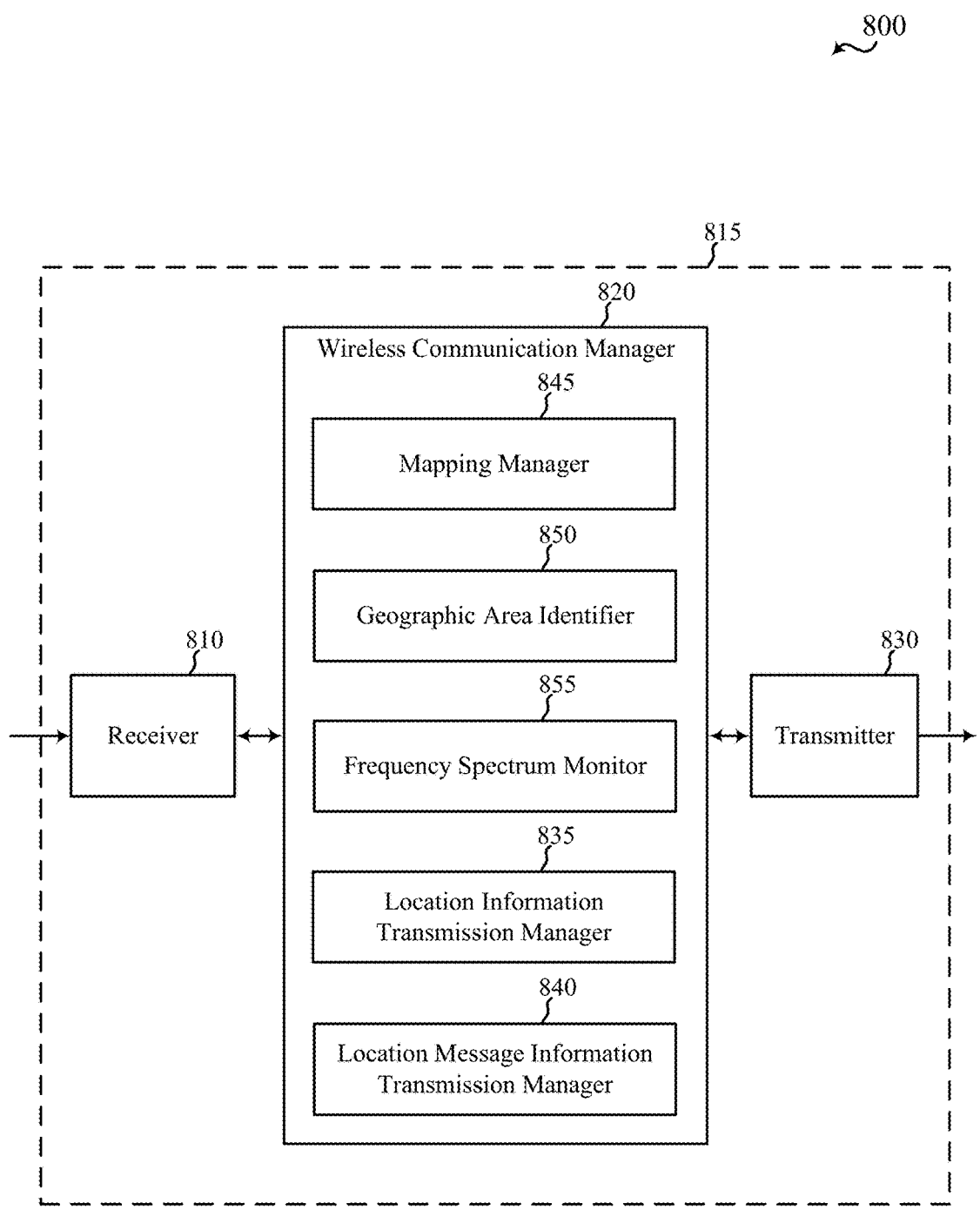
FIG. 8 shows a block diagram of an apparatus for use in wireless communication, in accordance with various aspects of the present disclosure.

FIG. 8 shows a block diagram 800 of an apparatus 815 for use in wireless communication, in accordance with various aspects of the present disclosure. The apparatus 815 may be an example of aspects of one or more of the vehicles 135 or 235 described with reference to FIG. 1 or 2, or aspects of the apparatus 715 described with reference to FIG. 7. The apparatus 815 may also be or include a processor. The apparatus 815 may include a receiver 810, a wireless communication manager 820, or a transmitter 830. Each of these components may be in communication with each other.

The components of the apparatus 815 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a number of radio frequency spectrum bands. In some examples, one or more of the radio frequency spectrum bands may be used for LTE/LTE-A communications, as described, for example, with reference to FIG. 1, 2, 3, or 4. The receiver 810 may be used to receive various types of data or control signals (i.e., transmissions) over one or more communication links of a wireless communication system, such as one or more communication links of the wireless communication system 100, 200, or 300 described with reference to FIG. 1, 2, or 3.

In some examples, the transmitter 830 may include at least one RF transmitter, such as at least one RF transmitter operable to transmit over the number of radio frequency spectrum bands. The transmitter 830 may be used to transmit various types of data or control signals (i.e., transmissions) over one or more communication links of a wireless communication system, such as one or more communication links of the wireless communication system 100, 200, or 300 described with reference to FIG. 1, 2, or 3.

In some examples, the wireless communication manager 820 may be used to manage one or more aspects of wireless communication for the apparatus 815. In some examples, part of the wireless communication manager 820 may be incorporated into or shared with the receiver 810 or the transmitter 830. In some examples, the wireless communication manager 820 may include a mapping manager 845, a geographic area identifier 850, a radio frequency spectrum monitor 855, a location information transmission manager 835, or a location message information transmission manager 840.

The mapping manager 845 may be used to receive at least one mapping (e.g., from a base station). In some examples, the at least one mapping may include a first mapping of geographic areas to sets of at least one subframe, or a second mapping of geographic areas to C-RNTIs. In some examples, the first mapping and/or second mapping may be received in at least one of: a SIB, or dedicated RRC signaling, or a combination thereof.

The geographic area identifier 850 may be used to identify a geographic area associated with a location of a vehicle that includes the apparatus 815.

The radio frequency spectrum monitor 855 may be used to monitor for transmissions in a set of at least one subframe mapped to the geographic area. Additionally or alternatively, the radio frequency spectrum monitor 855 may be used to monitor for transmissions associated with at least one C-RNTI mapped to the geographic area.

The location information transmission manager 835 may be used to transmit location information from the apparatus 815 to a base station on an AS layer (e.g., on a MAC layer (e.g., using a MAC layer control element), or on a PDCP layer, or on a combination thereof).

The target broadcast range transmission manager 860 may be used to transmit a target broadcast range for a location message to the base station.

The location message information transmission manager 840 may be used to transmit location message information from the apparatus 815 to the base station. The location message information may include at least one of: a content of a location message associated with the vehicle, or a type of the location message, or a combination thereof. In some examples, the location information transmission manager 815, the target broadcast range transmission manager 860, and/or the location message information manager 840 may be used, respectively, to transmit the location information, the target broadcast range, and/or the location message information in a same subframe.

Figure 9:
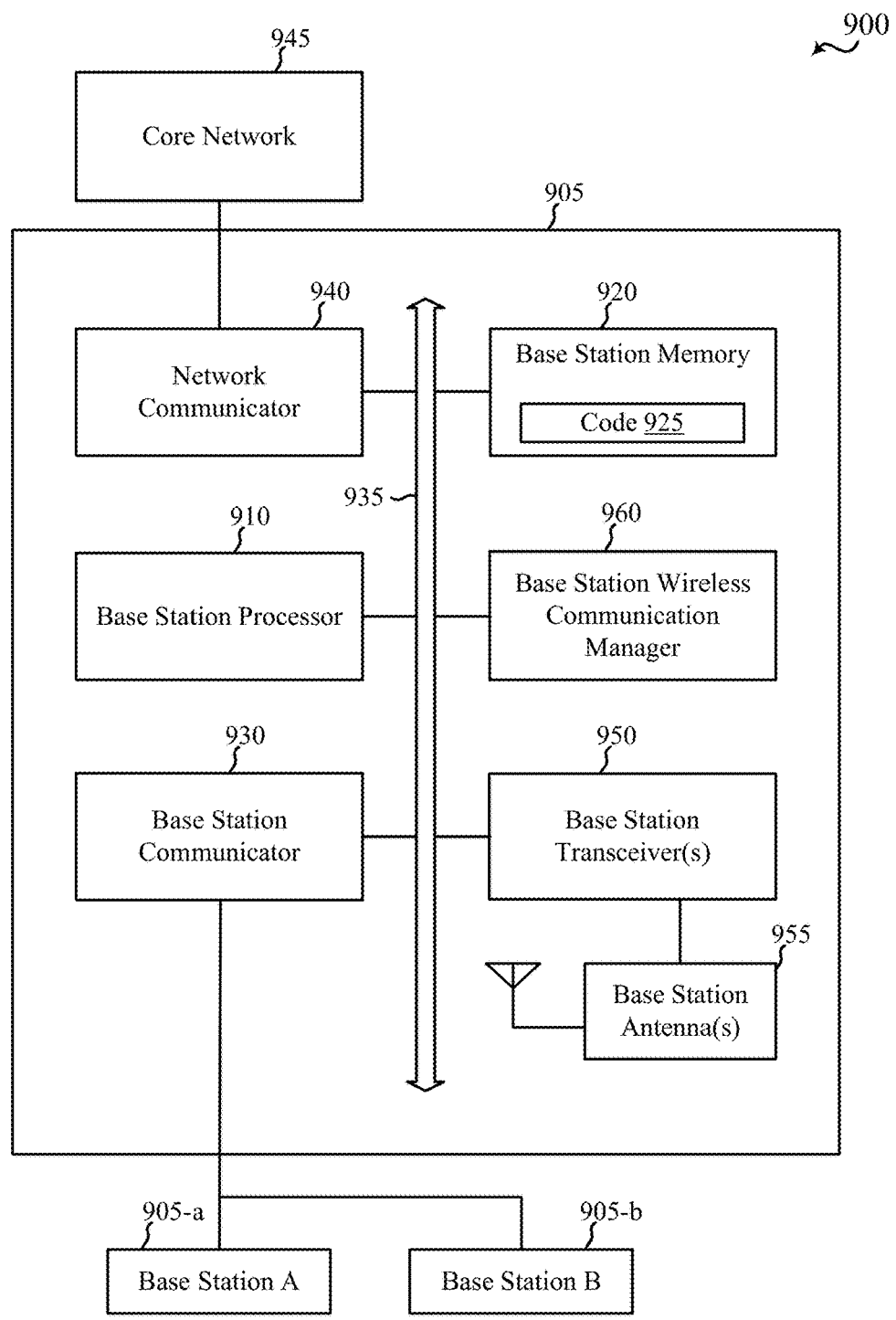
FIG. 9 shows a block diagram of a base station (e.g., a base station forming part or all of an eNB) for use in wireless communication, in accordance with various aspects of the present disclosure.

FIG. 9 shows a block diagram 900 of a base station 905 (e.g., a base station forming part or all of an eNB) for use in wireless communication, in accordance with various aspects of the present disclosure. In some examples, the base station 905 may be an example of one or more aspects of the base stations 105, 205, 205-*a*, 205-*b*, 305, 305-*a*, or 305-*b* described with reference to FIG. 1, 2, or 3, or aspects of one or more of the apparatuses 505 or 605 described with reference to FIG. 5 or 6. The base station 905 may be configured to implement or facilitate at least some of the base station techniques and functions described with reference to FIG. 1, 2, 3, 4, 5, or 6.

The base station 905 may include a base station processor 910, a base station memory 920, at least one base station transceiver (represented by base station transceiver(s) 950), at least one base station antenna (represented by base station antenna(s) 955), or a base station wireless communication manager 960. The base station 905 may also include one or more of a base station communicator 930 or a network communicator 940. Each of these components may be in communication with each other, directly or indirectly, over one or more buses 935.

The base station memory 920 may include random access memory (RAM) or read-only memory (ROM). The base station memory 920 may store computer-readable, computer-executable code 925 containing instructions that are configured to, when executed, cause the base station processor 910 to perform various functions described herein related to wireless communication, including, for example, receiving location information from vehicles; identifying, based at least in part on the location information, cells from which to broadcast location messages associated with the vehicles; and communicating with other base stations regarding broadcasts of the location messages. Alternatively, the computer-executable code 925 may not be directly executable by the base station processor 910 but be configured to cause the base station 905 (e.g., when compiled and executed) to perform various of the functions described herein.

The base station processor 910 may include an intelligent hardware device, e.g., a central processing unit (CPU), a microcontroller, an ASIC, etc. The base station processor 910 may process information received through the base station transceiver(s) 950, the base station communicator 930, or the network communicator 940. The base station processor 910 may also process information to be sent to the transceiver(s) 950 for transmission through the antenna(s) 955, to the base station communicator 930, for transmission to one or more other base stations (e.g., base station 905-*a* and base station 905-*b*), or to the network communicator 940 for transmission to a core network 945, which may be an example of one or more aspects of the core network 130 described with reference to FIG. 1. The base station processor 910 may handle, alone or in connection with the base station wireless communication manager 960, various aspects of communicating over (or managing communications over) a number of radio frequency spectrum bands.

The base station transceiver(s) 950 may include a modem configured to modulate packets and provide the modulated packets to the base station antenna(s) 955 for transmission, and to demodulate packets received from the base station antenna(s) 955. The base station transceiver(s) 950 may, in some examples, be implemented as one or more base station transmitters and one or more separate base station receivers. The base station transceiver(s) 950 may support communications over a number of radio frequency spectrum bands. The base station transceiver(s) 950 may be configured to communicate bi-directionally, via the antenna(s) 955, with one or more UEs, vehicles, or apparatuses, such as one or more of the UEs 115 described with reference to FIG. 1, one or more of the vehicles 135 or 235 described with reference to FIG. 1 or 2, or one or more of the apparatuses 715 or 815 described with reference to FIG. 7 or 8. The base station 905 may, for example, include multiple base station antennas 955 (e.g., an antenna array). The base station 905 may communicate with the core network 945 through the network communicator 940. The base station 905 may also communicate with other base stations, such as the base station 905-*a* and the base station 905-*b*, using the base station communicator 930.

The base station wireless communication manager 960 may be configured to perform or control some or all of the techniques or functions described with reference to FIG. 1, 2, 3, 4, 5, or 6 related to wireless communication over a number of radio frequency spectrum bands. The base station wireless communication manager 960, or portions of it, may include a processor, or some or all of the functions of the base station wireless communication manager 960 may be performed by the base station processor 910 or in connection with the base station processor 910. In some examples, the base station wireless communication manager 960 may be an example of the wireless communication manager 520 or 620 described with reference to FIG. 5 or 6.

Figure 10:
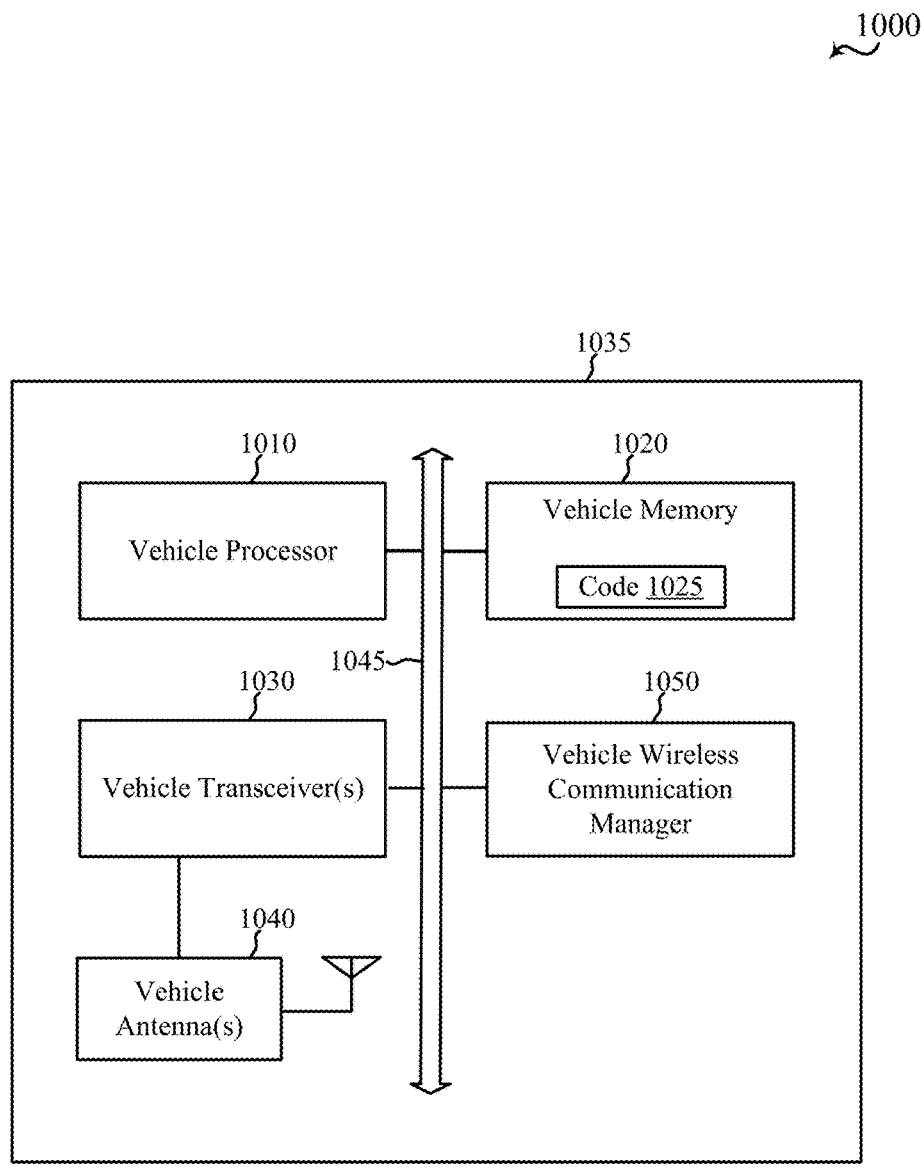
FIG. 10 shows a block diagram of a vehicle for use in wireless communication, in accordance with various aspects of the present disclosure.

FIG. 10 shows a block diagram 1000 of a vehicle 1035 for use in wireless communication, in accordance with various aspects of the present disclosure. The vehicle 1035 may, in some examples have an engine or battery to facilitate vehicle mobility and the powering of components used for wireless communication with a remote base station or other vehicles. In some examples, the vehicle 1035 may be an example of aspects of one or more of the vehicles 135 or 235 described with reference to FIG. 1 or 2, or aspects of the apparatus 715 or 815 described with reference to FIG. 7 or 8. The vehicle 1035 may be configured to implement at least some of the vehicle or apparatus techniques and functions described with reference to FIG. 1, 2, 3, 4, 7, or 8.

The vehicle 1035 may include a vehicle processor 1010, a vehicle memory 1020, at least one vehicle transceiver (represented by vehicle transceiver(s) 1030), at least one vehicle antenna (represented by vehicle antenna(s) 1040), or a vehicle wireless communication manager 1050. Each of these components may be in communication with each other, directly or indirectly, over one or more buses 1045.

The vehicle memory 1020 may include RAM or ROM. The vehicle memory 1020 may store computer-readable, computer-executable code 1025 containing instructions that are configured to, when executed, cause the vehicle processor 1010 to perform various functions described herein related to wireless communication, including, for example, transmitting location information, a target broadcast range, or location message information to a base station, or monitoring for messages received from base stations or other vehicles. Alternatively, the computer-executable code 1025 may not be directly executable by the vehicle processor 1010 but be configured to cause the vehicle 1035 (e.g., when compiled and executed) to perform various functions described herein.

The vehicle processor 1010 may include an intelligent hardware device, e.g., a CPU, a microcontroller, an ASIC, etc. The vehicle processor 1010 may process information received through the vehicle transceiver(s) 1030 or information to be sent to the vehicle transceiver(s) 1030 for transmission through the vehicle antenna(s) 1040. The vehicle processor 1010 may handle, alone or in connection with the vehicle wireless communication manager 1050, various aspects of communicating over (or managing communications over) a number of radio frequency spectrum bands.

The vehicle transceiver(s) 1030 may include a modem configured to modulate packets and provide the modulated packets to the vehicle antenna(s) 1040 for transmission, and to demodulate packets received from the vehicle antenna(s) 1040. The vehicle transceiver(s) 1030 may, in some examples, be implemented as one or more vehicle transmitters and one or more separate vehicle receivers. The vehicle transceiver(s) 1030 may support communications over a number of radio frequency spectrum bands. The vehicle transceiver(s) 1030 may be configured to communicate bi-directionally, via the vehicle antenna(s) 1040, with one or more of the base stations 105, 205, 205-a, 205-b, 305, 305-a, 305-b, or 905 described with reference to FIG. 1, 2, 3, or 9, or one or more of the apparatuses 505 or 605 described with reference to FIG. 5 or 6. While the vehicle 1035 may include a single vehicle antenna, there may be examples in which the vehicle 1035 may include multiple vehicle antennas 1040.

The vehicle wireless communication manager 1050 may be configured to perform or control some or all of the vehicle or apparatus techniques or functions described with reference to FIG. 1, 2, 3, 4, 7, or 8 related to wireless communication over a number of radio frequency spectrum bands. The vehicle wireless communication manager 1050, or portions of it, may include a processor, or some or all of the functions of the vehicle wireless communication manager 1050 may be performed by the vehicle processor 1010 or in connection with the vehicle processor 1010. In some examples, the vehicle wireless communication manager 1050 may be an example of the wireless communication manager 720 or 820 described with reference to FIG. 7 or 8.

Figure 11:
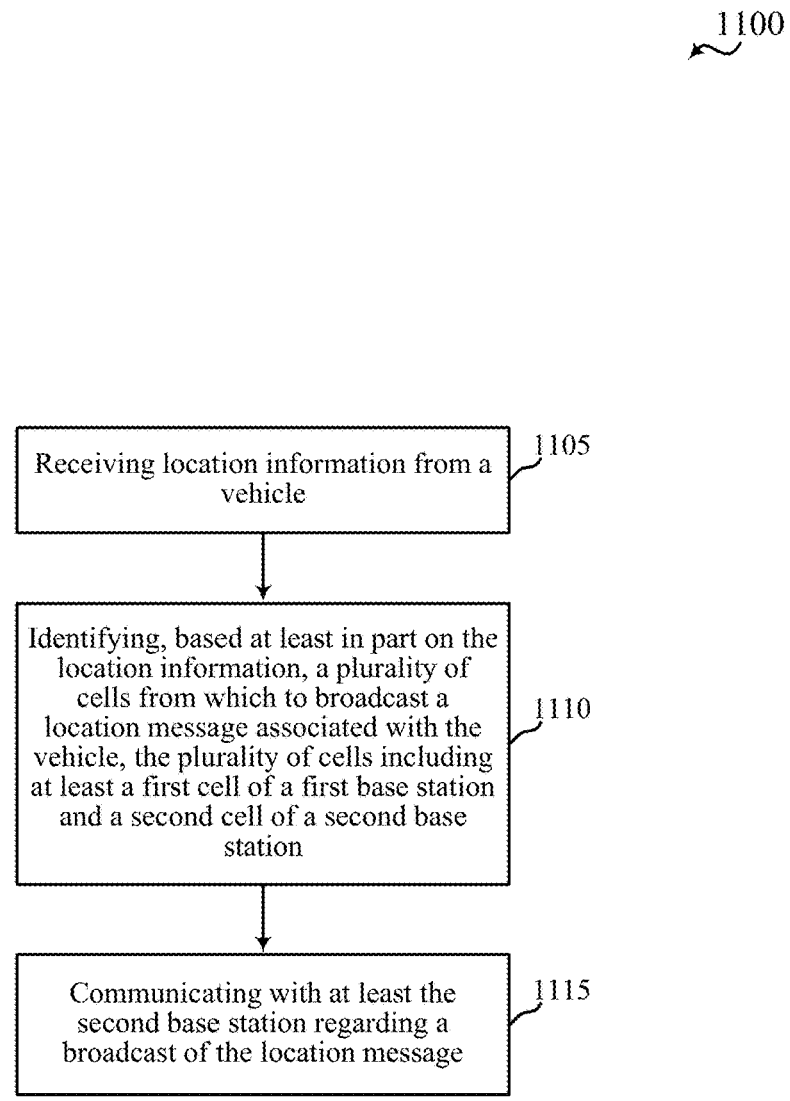
FIG. 11 is a flow chart illustrating an example of a method for wireless communication at a first base station, in accordance with various aspects of the present disclosure.

FIG. 11 is a flow chart illustrating an example of a method 1100 for wireless communication at a first base station, in accordance with various aspects of the present disclosure. For clarity, the method 1100 is described below with reference to aspects of one or more of the base stations 105, 205, 205-a, 205-b, 305, 305-a, 305-b, or 905 described with reference to FIG. 1, 2, 3, or 9, or aspects of one or more of the apparatuses 505 or 605 described with reference to FIG. 5 or 6. In some examples, a first base station may execute one or more sets of codes to control the functional elements of the first base station to perform the functions described below. Additionally or alternatively, the first base station may perform one or more of the functions described below using special-purpose hardware.

At block 1105, the method 1100 may include receiving location information from a vehicle. In some examples, the location information may be received from the vehicle on an AS layer (e.g., on a MAC layer (e.g., using a MAC layer control element), or on a PDCP layer, or on a combination thereof). The operation(s) at block 1105 may be performed using the wireless communication manager 520 or 620 or base station wireless communication manager 960 described with reference to FIG. 5, 6, or 9, the vehicle information manager 535 or 635 described with reference to FIG. 5 or 6, or the location information manager 540 or 640 described with reference to FIG. 5 or 6.

At block 1110, the method 1100 may include identifying, based at least in part on the location information, a plurality of cells from which to broadcast a location message associated with the vehicle. The plurality of cells may include at least a first cell of the first base station and a second cell of a second base station. The operation(s) at block 1110 may be performed using the wireless communication manager 520 or 620 or base station wireless communication manager 960 described with reference to FIG. 5, 6, or 9, the message broadcast manager 545 or 645 described with reference to FIG. 5 or 6, or the cell identifier 550 or 650 described with reference to FIG. 5 or 6.

At block 1115, the method 1100 may include communicating with at least the second base station regarding a broadcast of the location message. The operation(s) at block 1115 may be performed using the wireless communication manager 520 or 620 or base station wireless communication manager 960 described with reference to FIG. 5, 6, or 9, the message broadcast manager 545 or 645 described with reference to FIG. 5 or 6, or the broadcast coordinator 555 or 655 described with reference to FIG. 5 or 6.

Thus, the method 1100 may provide for wireless communication. It should be noted that the method 1100 is just one implementation and that the operations of the method 1100 may be rearranged or otherwise modified such that other implementations are possible.

Figure 12:
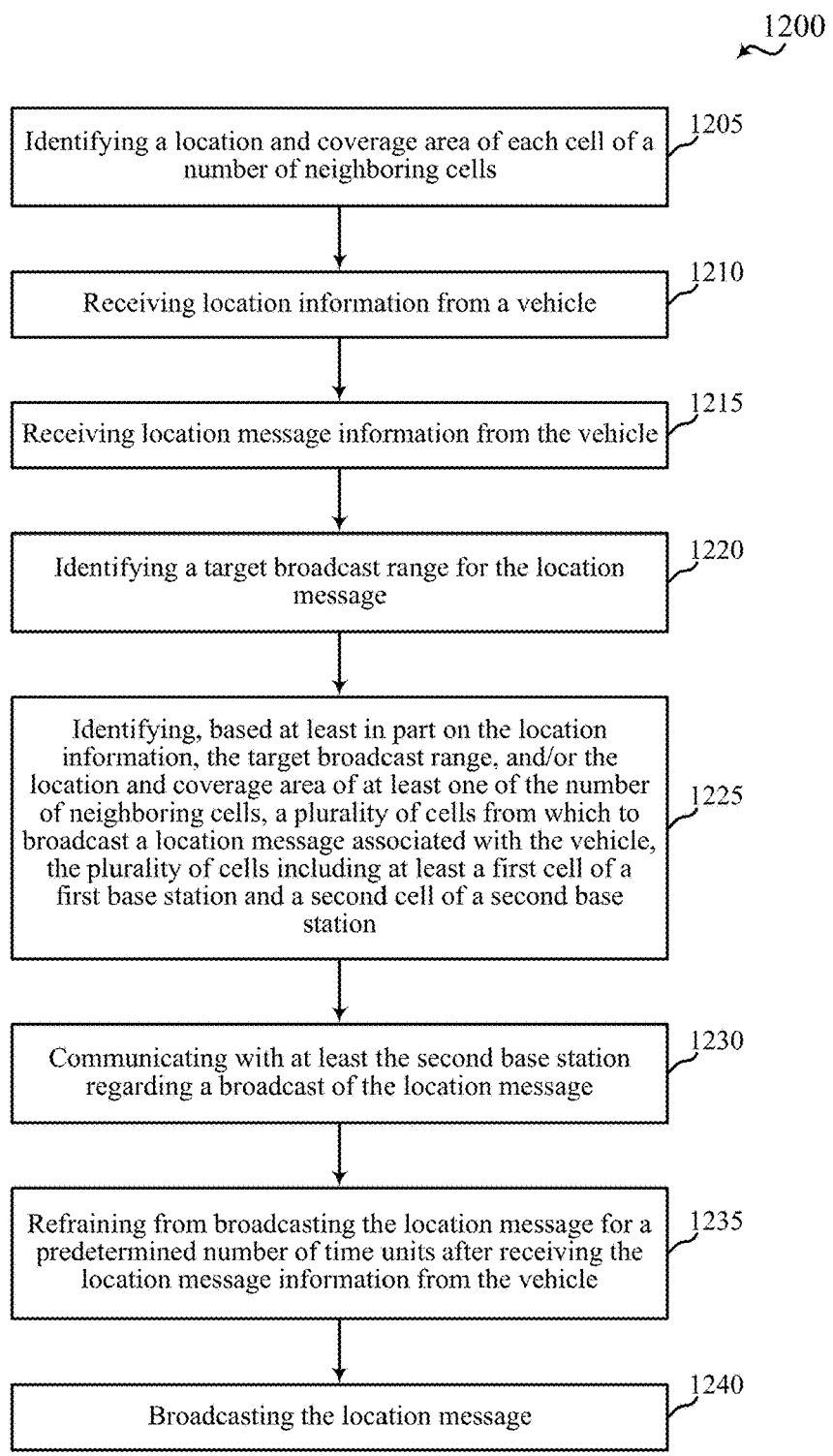
FIG. 12 is a flow chart illustrating an example of a method for wireless communication at a first base station, in accordance with various aspects of the present disclosure.

FIG. 12 is a flow chart illustrating an example of a method 1200 for wireless communication at a first base station, in accordance with various aspects of the present disclosure. For clarity, the method 1200 is described below with reference to aspects of one or more of the base stations 105, 205, 205-a, 205-b, 305, 305-a, 305-b, or 905 described with reference to FIG. 1, 2, 3, or 9, or aspects of one or more of the apparatuses 505 or 605 described with reference to FIG. 5 or 6. In some examples, the first base station may execute one or more sets of codes to control the functional elements of the first base station to perform the functions described below. Additionally or alternatively, the first base station may perform one or more of the functions described below using special-purpose hardware.

At block 1205, the method 1200 may include identifying a location and coverage area of each cell of a number of neighboring cells (which neighboring cell(s) may include one or more cells of the first base station and/or one or more cells of neighboring base stations). The operation(s) at block 1205 may be performed using the wireless communication manager 520 or 620 or base station wireless communication manager 960 described with reference to FIG. 5, 6, or 9, or the neighboring cell information collector 660 described with reference to FIG. 6.

At block 1210, the method 1200 may include receiving location information from a vehicle. In some examples, the location information may be received from the vehicle on an AS layer (e.g., on a MAC layer (e.g., using a MAC layer control element), or on a PDCP layer, or on a combination thereof). The operation(s) at block 1210 may be performed using the wireless communication manager 520 or 620 or base station wireless communication manager 960 described with reference to FIG. 5, 6, or 9, the vehicle information manager 535 or 635 described with reference to FIG. 5 or 6, or the location information manager 540 or 640 described with reference to FIG. 5 or 6.

At block 1215, the method 1200 may include receiving, from the vehicle, location message information. The location message information may include at least one of: a content of a location message associated with the vehicle, or a type of the location message, or a combination thereof. In some examples, the type of the location message may be inferred from an indication to broadcast a location message, which indication may be received from the vehicle. In some examples, the indication may include a single bit. In some examples, the indication may be a transmission of the location information (e.g., the location information received at block 1210). The operation(s) at block 1215 may be performed using the wireless communication manager 520 or 620 or base station wireless communication manager 960 described with reference to FIG. 5, 6, or 9, the vehicle information manager 535 or 635 described with reference to FIG. 5 or 6, or the location message information manager 665 described with reference to FIG. 6.

At block 1220, the method 1200 may include identifying a target broadcast range for the location message. In some examples, the target broadcast range may be identified based at least in part on: a type of the location message, or a type of the vehicle, or receiving the target broadcast range from the vehicle, or a combination thereof. The operation(s) at block 1220 may be performed using the wireless communication manager 520 or 620 or base station wireless communication manager 960 described with reference to FIG. 5, 6, or 9, the vehicle information manager 535 or 635 described with reference to FIG. 5 or 6, or the target broadcast range identifier 670 described with reference to FIG. 6.

At block 1225, the method 1200 may include identifying, based at least in part on the location information, the target broadcast range, and/or the location and coverage area of at least one of the number of neighboring cells, a plurality of cells from which to broadcast the location message. The plurality of cells may include at least a first cell of the first base station and a second cell of a second base station. The operation(s) at block 1225 may be performed using the wireless communication manager 520 or 620 or base station wireless communication manager 960 described with reference to FIG. 5, 6, or 9, the message broadcast manager 545 or 645 described with reference to FIG. 5 or 6, or the cell identifier 550 or 650 described with reference to FIG. 5 or 6.

At block 1230, the method 1200 may include communicating with at least the second base station regarding a broadcast of the location message. In some examples, the communicating may include transmitting to at least the second base station: a content of the location message, or a type of the location message, or the location information, or an indication of the plurality of cells, or a combination thereof. The operation(s) at block 1230 may be performed using the wireless communication manager 520 or 620 or base station wireless communication manager 960 described with reference to FIG. 5, 6, or 9, the message broadcast manager 545 or 645 described with reference to FIG. 5 or 6, or the broadcast coordinator 555 or 655 described with reference to FIG. 5 or 6.

At block 1235, the method 1200 may optionally include refraining from broadcasting the location message for a predetermined number of time units after receiving the location message information from the vehicle. The operation(s) at block 1235 may be performed using the wireless communication manager 520 or 620 or base station wireless communication manager 960 described with reference to FIG. 5, 6, or 9, the message broadcast manager 545 or 645 described with reference to FIG. 5 or 6, or the broadcast message delay timer 675 described with reference to FIG. 6.

At block 1240, the method 1200 may include broadcasting the location message. In some examples, the operation(s) at block 1240 may include broadcasting, according to a message order known to each cell of the plurality of cells, a plurality of location messages pertaining to a plurality of vehicles located in the geographic area. In some examples, the message order may be based at least in part on: an ordering of vehicle locations within the geographic area, a time order in which the location messages of the plurality of location messages are queued for transmission, a time order in which the location messages are received from the plurality of vehicles, or a combination thereof. The operation(s) at block 1240 may be performed using the wireless communication manager 520 or 620 or base station wireless communication manager 960 described with reference to FIG. 5, 6, or 9, or the message broadcast manager 545 or 645 described with reference to FIG. 5 or 6.

Thus, the method 1200 may provide for wireless communication. It should be noted that the method 1200 is just one implementation and that the operations of the method 1200 may be rearranged or otherwise modified such that other implementations are possible.

Figure 13:
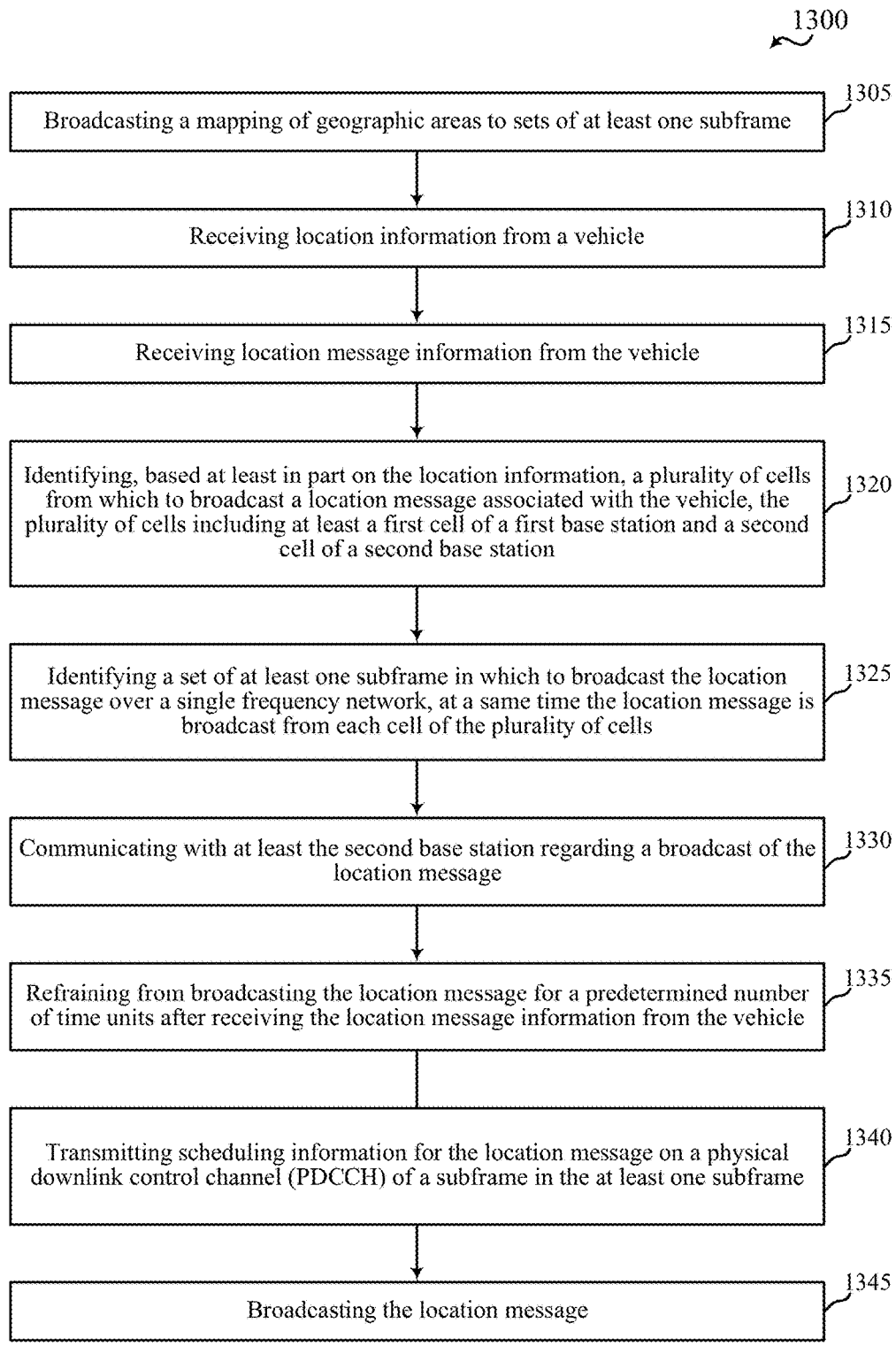
FIG. 13 is a flow chart illustrating an example of a method for wireless communication at a first base station, in accordance with various aspects of the present disclosure.

FIG. 13 is a flow chart illustrating an example of a method 1300 for wireless communication at a first base station, in accordance with various aspects of the present disclosure. For clarity, the method 1300 is described below with reference to aspects of one or more of the base stations 105, 205, 205-*a*, 205-*b*, 305, 305-*a*, 305-*b*, or 905 described with reference to FIG. 1, 2, 3, or 9, or aspects of one or more of the apparatuses 505 or 605 described with reference to FIG. 5 or 6. In some examples, a first base station may execute one or more sets of codes to control the functional elements of the first base station to perform the functions described below. Additionally or alternatively, the first base station may perform one or more of the functions described below using special-purpose hardware.

At block 1305, the method 1300 may include broadcasting (e.g., to vehicles) a mapping of geographic areas to sets of at least one subframe. In some examples, the mapping may be broadcast in at least one of: a SIB, dedicated RRC signaling, or a combination thereof. The operation(s) at block 1305 may be performed using the wireless communication manager 520 or 620 or base station wireless communication manager 960 described with reference to FIG. 5, 6, or 9, or the mapping broadcaster 680 described with reference to FIG. 6.

At block 1310, the method 1300 may include receiving location information from a vehicle. In some examples, the location information may be received from the vehicle on an AS layer (e.g., on a MAC layer (e.g., using a MAC layer control element), or on a PDCP layer, or on a combination thereof). The operation(s) at block 1310 may be performed using the wireless communication manager 520 or 620 or base station wireless communication manager 960 described with reference to FIG. 5, 6, or 9, the vehicle information manager 535 or 635 described with reference to FIG. 5 or 6, or the location information manager 540 or 640 described with reference to FIG. 5 or 6.

At block 1315, the method 1300 may include receiving, from the vehicle, location message information. The location message information may include at least one of: a content of a location message associated with the vehicle, or a type of the location message, or a combination thereof. In some examples, the type of the location message may be inferred from an indication to broadcast a location message, which indication may be received from the vehicle. In some examples, the indication may include a single bit. In some examples, the indication may be a transmission of the location information (e.g., the location information received at block 1310). The operation(s) at block 1315 may be performed using the wireless communication manager 520 or 620 or base station wireless communication manager 960 described with reference to FIG. 5, 6, or 9, the vehicle information manager 535 or 635 described with reference to FIG. 5 or 6, or the location message information manager 665 described with reference to FIG. 6.

At block 1320, the method 1300 may include identifying, based at least in part on the location information, a plurality of cells from which to broadcast a location message associated with the vehicle. In some examples, the plurality of cells may also be identified based at least in part on a target broadcast range for the location message and/or a location and coverage area of at least one neighboring cell (e.g., at least one neighboring cell of the first cell of the first base station, which neighboring cell(s) may include one or more cells of the first base station and/or one or more cells of neighboring base stations). The plurality of cells may include at least a first cell of the first base station and a second cell of a second base station. The operation(s) at block 1320 may be performed using the wireless communication manager 520 or 620 or base station wireless communication manager 960 described with reference to FIG. 5, 6, or 9, the message broadcast manager 545 or 645 described with reference to FIG. 5 or 6, or the cell identifier 550 or 650 described with reference to FIG. 5 or 6.

At block 1325, the method 1300 may include identifying a set of at least one subframe in which to broadcast the location message over a single frequency network, at a same time the location message is broadcast from each cell of the plurality of cells. In some examples, the set of at least one subframe may include a set of at least one LTE/LTE-A MB SFN subframe. In some examples, identifying the set of at least one subframe may include identifying a geographic area associated with the location information, and indexing, using the geographic area, the mapping of geographic areas to sets of at least one subframe. The operation(s) at block 1320 may be performed using the wireless communication manager 520 or 620 or base station wireless communication manager 960 described with reference to FIG. 5, 6, or 9, the message broadcast manager 545 or 645 described with reference to FIG. 5 or 6, or the subframe identifier 685 described with reference to FIG. 6.

At block 1330, the method 1300 may include communicating with at least the second base station regarding a broadcast of the location message. In some examples, the communicating may include transmitting to at least the second base station: a content of the location message, or a type of the location message, or the location information, or an indication of the plurality of cells, or a combination thereof. The operation(s) at block 1330 may be performed using the wireless communication manager 520 or 620 or base station wireless communication manager 960 described with reference to FIG. 5, 6, or 9, the message broadcast manager 545 or 645 described with reference to FIG. 5 or 6, or the broadcast coordinator 555 or 655 described with reference to FIG. 5 or 6.

At block 1335, the method 1300 may optionally include refraining from broadcasting the location message for a predetermined number of time units after receiving the location message information from the vehicle. The operation(s) at block 1335 may be performed using the wireless communication manager 520 or 620 or base station wireless communication manager 960 described with reference to FIG. 5, 6, or 9, the message broadcast manager 545 or 645 described with reference to FIG. 5 or 6, or the broadcast message delay timer 675 described with reference to FIG. 6.

At block 1340, the method 1300 may include transmitting scheduling information for the location message on a PDCCH of a subframe in the at least one subframe. The scheduling information may be associated with a C-RNTI reserved for broadcasting location messages to vehicles. In some examples, the operation(s) at block 1340 may also include transmitting scheduling information for at least one non-vehicle data transmission on the PDCCH of the subframe. The scheduling information for the at least one non-vehicle data transmission may not be associated with the C-RNTI reserved for broadcasting location messages to vehicles (but may be associated with one or more other C-RNTIs). The operation(s) at block 1340 may be performed using the wireless communication manager 520 or 620 or base station wireless communication manager 960 described with reference to FIG. 5, 6, or 9, the message broadcast manager 545 or 645 described with reference to FIG. 5 or 6, or the message scheduler 690 described with reference to FIG. 6.

At block 1345, the method 1300 may include broadcasting the location message. In some examples, the operation(s) at block 1345 may include broadcasting, according to a message order known to each cell of the plurality of cells, a plurality of location messages pertaining to a plurality of vehicles located in the geographic area. In some examples, the message order may be based at least in part on: an ordering of vehicle locations within the geographic area, a time order in which the location messages of the plurality of location messages are queued for transmission, a time order in which the location messages are received from the plurality of vehicles, or a combination thereof. The operation(s) at block 1345 may be performed using the wireless communication manager 520 or 620 or base station wireless communication manager 960 described with reference to FIG. 5, 6, or 9, or the message broadcast manager 545 or 645 described with reference to FIG. 5 or 6.

Thus, the method 1300 may provide for wireless communication. It should be noted that the method 1300 is just one implementation and that the operations of the method 1300 may be rearranged or otherwise modified such that other implementations are possible.

Figure 14:
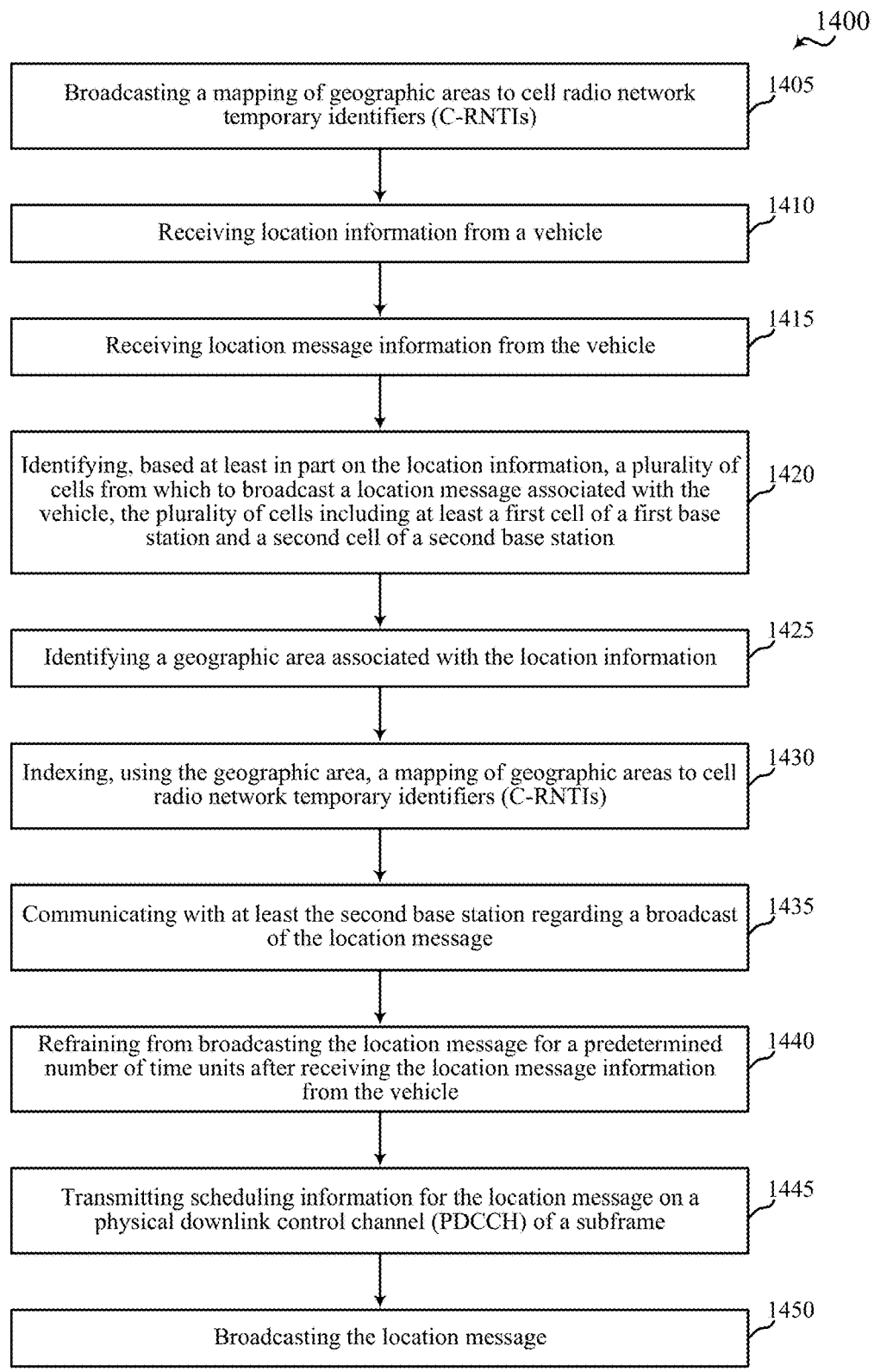
FIG. 14 is a flow chart illustrating an example of a method for wireless communication at a first base station, in accordance with various aspects of the present disclosure.

FIG. 14 is a flow chart illustrating an example of a method 1400 for wireless communication at a first base station, in accordance with various aspects of the present disclosure. For clarity, the method 1400 is described below with reference to aspects of one or more of the base stations 105, 205, 205-*a*, 205-*b*, 305, 305-*a*, 305-*b*, or 905 described with reference to FIG. 1, 2, 3, or 9, or aspects of one or more of the apparatuses 505 or 605 described with reference to FIG. 5 or 6. In some examples, a first base station may execute one or more sets of codes to control the functional elements of the first base station to perform the functions described below. Additionally or alternatively, the first base station may perform one or more of the functions described below using special-purpose hardware.

At block 1405, the method 1400 may include broadcasting (e.g., to vehicles) a mapping of geographic areas to C-RNTIs. In some examples, the mapping may be broadcast in at least one of: a SIB, or dedicated RRC signaling, or a combination thereof. The operation(s) at block 1405 may be performed using the wireless communication manager 520 or 620 or base station wireless communication manager 960 described with reference to FIG. 5, 6, or 9, or the mapping broadcaster 680 described with reference to FIG. 6.

At block 1410, the method 1400 may include receiving location information from a vehicle. In some examples, the location information may be received from the vehicle on an AS layer (e.g., on a MAC layer (e.g., using a MAC layer control element), or on a PDCP layer, or on a combination thereof). The operation(s) at block 1410 may be performed using the wireless communication manager 520 or 620 or base station wireless communication manager 960 described with reference to FIG. 5, 6, or 9, the vehicle information manager 535 or 635 described with reference to FIG. 5 or 6, or the location information manager 540 or 640 described with reference to FIG. 5 or 6.

At block 1415, the method 1400 may include receiving, from the vehicle, location message information. The location message information may include at least one of: a content of a location message associated with the vehicle, or a type of the location message, or a combination thereof. In some examples, the type of the location message may be inferred from an indication to broadcast a location message, which indication may be received from the vehicle. In some examples, the indication may include a single bit. In some examples, the indication may be a transmission of the location information (e.g., the location information received at block 1410). The operation(s) at block 1415 may be performed using the wireless communication manager 520 or 620 or base station wireless communication manager 960 described with reference to FIG. 5, 6, or 9, the vehicle information manager 535 or 635 described with reference to FIG. 5 or 6, or the location message information manager 665 described with reference to FIG. 6.

At block 1420, the method 1400 may include identifying, based at least in part on the location information, a plurality of cells from which to broadcast a location message associated with the vehicle. In some examples, the plurality of cells may also be identified based at least in part on a target broadcast range for the location message and/or a location and coverage area of at least one neighboring cell (e.g., at least one neighboring cell of the first cell of the first base station, which neighboring cell(s) may include one or more cells of the first base station and/or one or more cells of neighboring base stations). The plurality of cells may include at least a first cell of the first base station and a second cell of a second base station. The operation(s) at block 1420 may be performed using the wireless communication manager 520 or 620 or base station wireless communication manager 960 described with reference to FIG. 5, 6, or 9, the message broadcast manager 545 or 645 described with reference to FIG. 5 or 6, or the cell identifier 550 or 650 described with reference to FIG. 5 or 6.

At block 1425, the method 1400 may include identifying a geographic area associated with the location information. At block 1430, the method 1400 may include indexing, using the geographic area, the mapping of geographic areas to C-RNTIs. The operation(s) at block 1425 may be performed using the wireless communication manager 520 or 620 or base station wireless communication manager 960 described with reference to FIG. 5, 6, or 9, the message broadcast manager 545 or 645 described with reference to FIG. 5 or 6, or the C-RNTI identifier 695 described with reference to FIG. 6.

At block 1435, the method 1400 may include communicating with at least the second base station regarding a broadcast of the location message. In some examples, the communicating may include transmitting to at least the second base station: a content of the location message, or a type of the location message, or the location information, or an indication of the plurality of cells, or a combination thereof. The operation(s) at block 1435 may be performed using the wireless communication manager 520 or 620 or base station wireless communication manager 960 described with reference to FIG. 5, 6, or 9, the message broadcast manager 545 or 645 described with reference to FIG. 5 or 6, or the broadcast coordinator 555 or 655 described with reference to FIG. 5 or 6.

At block 1440, the method 1400 may optionally include refraining from broadcasting the location message for a predetermined number of time units after receiving the location message information from the vehicle. The operation(s) at block 1440 may be performed using the wireless communication manager 520 or 620 or base station wireless communication manager 960 described with reference to FIG. 5, 6, or 9, the message broadcast manager 545 or 645 described with reference to FIG. 5 or 6, or the broadcast message delay timer 675 described with reference to FIG. 6.

At block 1445, the method 1400 may include transmitting scheduling information for the location message on a PDCCH of a subframe. In some examples, the scheduling information may be associated with a C-RNTI mapped to the geographic area. In some examples, the operation(s) at block 1445 may also include transmitting scheduling information for at least one non-vehicle data transmission on the PDCCH of the subframe. The scheduling information for the at least one non-vehicle data transmission may not be associated with the C-RNTI reserved for broadcasting location messages to vehicles (but may be associated with one or more other C-RNTIs). The operation(s) at block 1445 may be performed using the wireless communication manager 520 or 620 or base station wireless communication manager 960 described with reference to FIG. 5, 6, or 9, the message broadcast manager 545 or 645 described with reference to FIG. 5 or 6, or the message scheduler 690 described with reference to FIG. 6.

At block 1450, the method 1400 may include broadcasting the location message. In some examples, the operation(s) at block 1450 may include broadcasting, according to a message order known to each cell of the plurality of cells, a plurality of location messages pertaining to a plurality of vehicles located in the geographic area. In some examples, the message order may be based at least in part on: an ordering of vehicle locations within the geographic area, a time order in which the location messages of the plurality of location messages are queued for transmission, a time order in which the location messages are received from the plurality of vehicles, or a combination thereof. The operation(s) at block 1450 may be performed using the wireless communication manager 520 or 620 or base station wireless communication manager 960 described with reference to FIG. 5, 6, or 9, or the message broadcast manager 545 or 645 described with reference to FIG. 5 or 6.

Thus, the method 1400 may provide for wireless communication. It should be noted that the method 1400 is just one implementation and that the operations of the method 1400 may be rearranged or otherwise modified such that other implementations are possible.

In some examples, aspects of the methods 1100, 1200, 1300, or 1400 described with reference to FIG. 11, 12, 13, or 14 may be combined.

Figure 15:
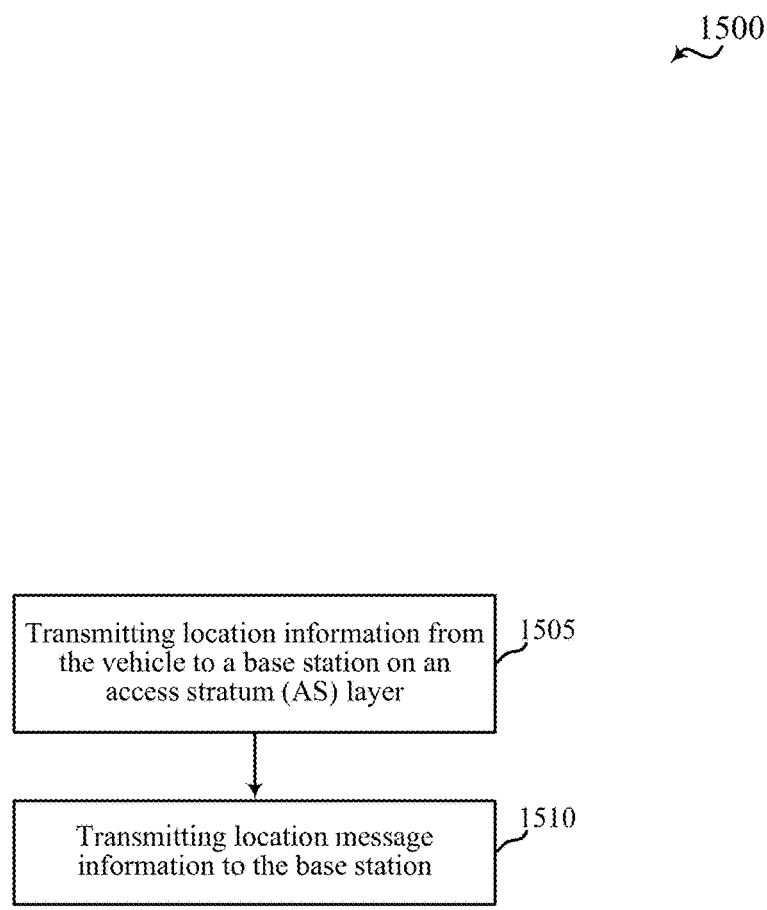
FIG. 15 is a flow chart illustrating an example of a method for wireless communication at a vehicle, in accordance with various aspects of the present disclosure.

FIG. 15 is a flow chart illustrating an example of a method 1500 for wireless communication at a vehicle, in accordance with various aspects of the present disclosure. For clarity, the method 1500 is described below with reference to aspects of one or more of the vehicles 135, 235, or 1035 described with reference to FIG. 1, 2, or 10, or aspects of one or more of the apparatuses 715 or 815 described with reference to FIG. 7 or 8. In some examples, a vehicle may execute one or more sets of codes to control the functional elements of the vehicle to perform the functions described below. Additionally or alternatively, the vehicle may perform one or more of the functions described below using special-purpose hardware.

At block 1505, the method 1500 may include transmitting location information from the vehicle to a base station on an AS layer (e.g., on a MAC layer (e.g., using a MAC layer control element), or on a PDCP layer, or on a combination thereof). The operation(s) at block 1505 may be performed using the wireless communication manager 720 or 820 or vehicle wireless communication manager 1050 described with reference to FIG. 7, 8, or 10, or the location information transmission manager 715 or 815 described with reference to FIG. 7 or 8.

At block 1510, the method 1500 may include transmitting location message information from the vehicle to the base station. The location message information may include at least one of: a content of a location message associated with the vehicle, or a type of the location message, or a combination thereof. The operation(s) at block 1510 may be performed using the wireless communication manager 720 or 820 or vehicle wireless communication manager 1050 described with reference to FIG. 7, 8, or 10, or the location message information transmission manager 740 or 840 described with reference to FIG. 7 or 8.

Thus, the method 1500 may provide for wireless communication. It should be noted that the method 1500 is just one implementation and that the operations of the method 1500 may be rearranged or otherwise modified such that other implementations are possible.

Figure 16:
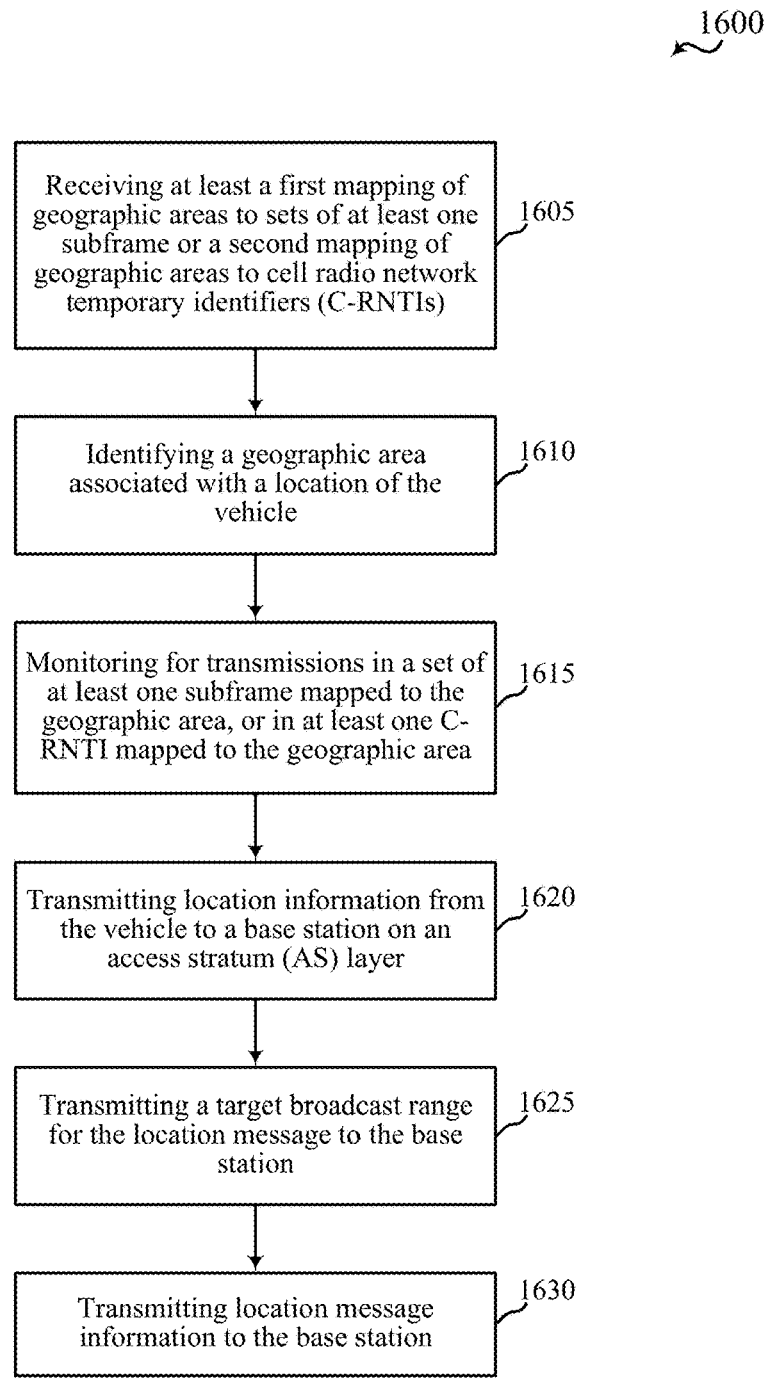
FIG. 16 is a flow chart illustrating an example of a method for wireless communication at a vehicle, in accordance with various aspects of the present disclosure.

FIG. 16 is a flow chart illustrating an example of a method 1600 for wireless communication at a vehicle, in accordance with various aspects of the present disclosure. For clarity, the method 1600 is described below with reference to aspects of one or more of the vehicles 135, 235, or 1035 described with reference to FIG. 1, 2, or 10, or aspects of one or more of the apparatuses 715 or 815 described with reference to FIG. 7 or 8. In some examples, a vehicle may execute one or more sets of codes to control the functional elements of the vehicle to perform the functions described below. Additionally or alternatively, the vehicle may perform one or more of the functions described below using special-purpose hardware.

At block 1605, the method 1600 may include receiving at least one mapping (e.g., from a base station). In some examples, the at least one mapping may include a first mapping of geographic areas to sets of at least one subframe, or a second mapping of geographic areas to C-RNTIs. In some examples, the first mapping and/or second mapping may be received in at least one of: a SIB, or dedicated RRC signaling, or a combination thereof. The operation(s) at block 1605 may be performed using the wireless communication manager 720 or 820 or vehicle wireless communication manager 1050 described with reference to FIG. 7, 8, or 10, or the mapping manager 845 described with reference to FIG. 8.

At block 1610, the method 1600 may include identifying a geographic area associated with a location of the vehicle. The operation(s) at block 1610 may be performed using the wireless communication manager 720 or 820 or vehicle wireless communication manager 1050 described with reference to FIG. 7, 8, or 10, or the geographic area identifier 850 described with reference to FIG. 8.

At block 1615, the method 1600 may include monitoring for transmissions in a set of at least one subframe mapped to the geographic area. Additionally or alternatively, the method 1600 may include monitoring for transmissions associated with at least one C-RNTI mapped to the geographic area. The operation(s) at block 1615 may be performed using the wireless communication manager 720 or 820 or vehicle wireless communication manager 1050 described with reference to FIG. 7, 8, or 10, or the radio frequency spectrum monitor 855 described with reference to FIG. 8.

At block 1620, the method 1600 may include transmitting location information from the vehicle to a base station on an AS layer (e.g., on a MAC layer (e.g., using a MAC layer control element), or on a PDCP layer, or on a combination thereof). The operation(s) at block 1620 may be performed using the wireless communication manager 720 or 820 or vehicle wireless communication manager 1050 described with reference to FIG. 7, 8, or 10, or the location information transmission manager 715 or 815 described with reference to FIG. 7 or 8.

At block 1625, the method 1600 may include transmitting a target broadcast range for a location message to the base station. The operation(s) at block 1625 may be performed using the wireless communication manager 720 or 820 or vehicle wireless communication manager 1050 described with reference to FIG. 7, 8, or 10, or the target broadcast range transmission manager 860 described with reference to FIG. 8.

At block 1630, the method 1600 may include transmitting location message information from the vehicle to the base station. The location message information may include at least one of: a content of the location message associated with the vehicle, or a type of the location message, or a combination thereof. In some examples, the location information, the target broadcast range, and/or the location message information may be transmitted in a same subframe. The operation(s) at block 1630 may be performed using the wireless communication manager 720 or 820 or vehicle wireless communication manager 1050 described with reference to FIG. 7, 8, or 10, or the location message information transmission manager 740 or 840 described with reference to FIG. 7 or 8.

Thus, the method 1600 may provide for wireless communication. It should be noted that the method 1600 is just one implementation and that the operations of the method 1600 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1X, 1X, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the present disclosure. These techniques, however, may be practiced without these specific details. In some instances, well-known structures and apparatuses are shown in block diagram form in order to avoid obscuring the concepts of the present disclosure.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and BLU-RAY disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a first base station, comprising:
   receiving location information from a vehicle;
   identifying, based at least in part on the location information, a plurality of cells from which to broadcast a location message associated with the vehicle, the plurality of cells including a cell of a second base station, wherein the location message is based at least in part on the location information;

identifying a set of at least one subframe in which to broadcast the location message over a single frequency network, at a same time the location message is broadcast from each cell of the plurality of cells; and communicating with at least the second base station regarding the broadcast of the location message.

2. The method of claim 1, wherein the location information is received from the vehicle on an access stratum (AS) layer.

3. The method of claim 1, further comprising:
identifying a target broadcast range for the location message; and
wherein the plurality of cells is further identified based at least in part on the target broadcast range.

4. The method of claim 3, wherein the target broadcast range is identified based at least in part on:
a type of the location message, or a type of the vehicle, or receiving the target broadcast range from the vehicle, or a combination thereof.

5. The method of claim 1, further comprising:
identifying a location and coverage area of each cell of a number of neighboring cells; and
wherein the plurality of cells is further identified based at least in part on the location and coverage area of at least one of the number of neighboring cells.

6. The method of claim 1, further comprising:
receiving, from the vehicle, location message information comprising at least one of: a content of the location message, or a type of the location message, or a combination thereof.

7. The method of claim 6, further comprising:
refraining from broadcasting the location message for a predetermined number of time units after receiving the location message information from the vehicle.

8. The method of claim 1, wherein communicating with at least the second base station comprises:
transmitting to at least the second base station: a content of the location message, or a type of the location message, or the location information, or an indication of the plurality of cells, or a combination thereof.

9. The method of claim 1, wherein identifying the set of at least one subframe comprises:
identifying a geographic area associated with the location information; and
indexing, using the geographic area, a mapping of geographic areas to sets of at least one subframe.

10. The method of claim 9, further comprising:
broadcasting the mapping of geographic areas to sets of at least one subframe in at least one of: a system information block (SIB), or dedicated radio resource control (RRC) signaling, or a combination thereof.

11. The method of claim 9, further comprising:
broadcasting, according to a message order known to each cell of the plurality of cells, a plurality of location messages pertaining to a plurality of vehicles located in the geographic area.

12. The method of claim 11, wherein the message order is based at least in part on:
an ordering of vehicle locations within the geographic area, a time order in which location messages of the plurality of location messages are queued for transmission, a time order in which the location messages are received from the plurality of vehicles, or a combination thereof.

13. The method of claim 1, further comprising:
transmitting scheduling information for the location message on a physical downlink control channel (PDCCH) of a subframe in the at least one subframe, the scheduling information associated with a cell radio network temporary identifier (C-RNTI) reserved for broadcasting location messages to vehicles.

14. The method of claim 13, further comprising:
transmitting scheduling information for at least one non-vehicle data transmission on the PDCCH of the subframe.

15. The method of claim 1, further comprising:
identifying a geographic area associated with the location information; and
indexing, using the geographic area, a mapping of geographic areas to cell radio network temporary identifiers (C-RNTIs); and
transmitting scheduling information for the location message on a physical downlink control channel (PDCCH) of a subframe, the scheduling information associated with a C-RNTI mapped to the geographic area.

16. The method of claim 15, further comprising:
broadcasting the mapping of geographic areas to C-RNTIs in at least one of: a system information block (SIB), or dedicated radio resource control (RRC) signaling, or a combination thereof.

17. A method for wireless communication at a vehicle, comprising:
transmitting location information from the vehicle to a base station on an access stratum (AS) layer;
transmitting a target broadcast range for a location message to the base station; and
transmitting location message information to the base station.

18. The method of claim 17, wherein the location message information comprises at least one of:
a content of a location message, or a type of the location message, or a combination thereof.

19. The method of claim 17, wherein the location information and the location message information are transmitted in a same subframe.

20. The method of claim 17, further comprising:
receiving a mapping of geographic areas to sets of at least one subframe in at least one of: a system information block (SIB), or dedicated radio resource control (RRC) signaling, or a combination thereof;
identifying a geographic area associated with a location of the vehicle; and
monitoring for transmissions in a set of at least one subframe mapped to the geographic area.

21. The method of claim 17, further comprising:
receiving a mapping of geographic areas to cell radio network temporary identifiers (C-RNTIs) in at least one of: a system information block (SIB), or dedicated radio resource control (RRC) signaling, or a combination thereof;
identifying a geographic area associated with a location of the vehicle; and
monitoring for transmissions associated with at least one C-RNTI mapped to the geographic area.

22. An apparatus for wireless communication at a first base station, comprising:
a receiver;
a transmitter;
a processor;
a memory in electronic communication with the processor; and
instructions stored in the memory and executable by the processor to cause the apparatus to:
receive location information from a vehicle;

identify, based at least in part on the location information, a plurality of cells from which to broadcast a location message associated with the vehicle, the plurality of cells including a cell of a second base station, wherein the location message is based at least in part on the location information;

identify a set of at least one subframe in which to broadcast the location message over a single frequency network, at a same time the location message is broadcast from each cell of the plurality of cells; and communicate with at least the second base station regarding the broadcast of the location message.

23. The apparatus of claim 22, wherein the location information is received from the vehicle on an access stratum (AS) layer.

24. The apparatus of claim 22, wherein the instructions stored in the memory and executable by the processor further cause the apparatus to:

identify a target broadcast range for the location message; and wherein the plurality of cells is further identified based at least in part on the target broadcast range.

25. The apparatus of claim 24, wherein the target broadcast range is identified based at least in part on:

a type of the location message, or a type of the vehicle, or receiving the target broadcast range from the vehicle, or a combination thereof.

26. The apparatus of claim 22, wherein the instructions stored in the memory and executable by the processor further cause the apparatus to:

identify a location and coverage area of each cell of a number of neighboring cells; and wherein the plurality of cells is further identified based at least in part on the location and coverage area of at least one of the number of neighboring cells.

27. The apparatus of claim 22, wherein the instructions stored in the memory and executable by the processor further cause the apparatus to:

receive, from the vehicle, location message information comprising at least one of: a content of the location message, or a type of the location message, or a combination thereof.

28. An apparatus for wireless communication at a vehicle, comprising:

a receiver;

a transmitter;

a processor;

a memory in electronic communication with the processor; and instructions stored in the memory and executable by the processor to cause the apparatus to:

transmit location information from the vehicle to a base station on an access stratum (AS) layer;

transmit a target broadcast range for a location message to the base station; and transmit location message information to the base station.

* * * * *